US010453018B2

(12) United States Patent
Blank et al.

(10) Patent No.: US 10,453,018 B2
(45) Date of Patent: Oct. 22, 2019

(54) AGRICULTURAL INFORMATION SENSING AND RETRIEVAL

(71) Applicant: Deere & Company, Moline, IL (US)

(72) Inventors: Sebastian Blank, Kaiserslautern (DE); Dohn W. Pfeiffer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 417 days.

(21) Appl. No.: 14/925,237

(22) Filed: Oct. 28, 2015

(65) Prior Publication Data

US 2016/0078391 A1 Mar. 17, 2016

Related U.S. Application Data

(63) Continuation-in-part of application No. 14/546,725, filed on Nov. 18, 2014, now Pat. No. 10,311,527, which is a continuation-in-part of application No. 14/445,699, filed on Jul. 29, 2014, which is a continuation-in-part of application No. 14/271,077, filed on May 6, 2014, which is a continuation-in-part of application No. 14/155,023, filed on Jan. 14, 2014, now Pat. No. 9,892,376.

(51) Int. Cl.
G06Q 50/00 (2012.01)
G06F 16/24 (2019.01)
G06Q 10/06 (2012.01)
G06Q 50/02 (2012.01)

(52) U.S. Cl.
CPC ....... *G06Q 10/06398* (2013.01); *G06F 16/24* (2019.01); *G06Q 50/02* (2013.01)

(58) Field of Classification Search
None
See application file for complete search history.

(56) References Cited

U.S. PATENT DOCUMENTS

| 4,951,031 A | 8/1990 | Strubbe |
| 5,585,757 A | 12/1996 | Frey |
| 5,679,094 A | 10/1997 | Nakamura et al. |
| 5,734,849 A | 3/1998 | Butcher |

(Continued)

FOREIGN PATENT DOCUMENTS

| CN | 101622928 A | 1/2010 |
| EP | 1111550 A1 | 6/2001 |

(Continued)

OTHER PUBLICATIONS

U.S. Appl. No. 14/546,725 Final Office Action dated Nov. 16, 2017, 23 pages.

(Continued)

Primary Examiner — Kris E Mackes
Assistant Examiner — Soheila (Gina) Davanlou
(74) Attorney, Agent, or Firm — Joseph R. Kelly; Kelly, Holt & Christenson PLLC

(57) ABSTRACT

Performance information indicative of operator performance of a mobile machine is detected. Context criteria are identified based on a sensed context of the mobile machine. As set of performance data is parsed to identify reference data, based on the context criteria. A performance opportunity space is identified, by comparing the detected performance information to the reference data. A user interface component is controlled to surface the performance opportunity space for interaction.

12 Claims, 31 Drawing Sheets

(56) References Cited

U.S. PATENT DOCUMENTS

| | | |
|---|---|---|
| 5,751,199 A | 5/1998 | Shiau et al. |
| 5,755,281 A | 5/1998 | Kang et al. |
| 6,449,932 B1 | 9/2002 | Cooper et al. |
| 6,990,459 B2 | 1/2006 | Schneider |
| 6,999,877 B1 | 2/2006 | Dyer |
| 7,047,135 B2 | 5/2006 | Dyer |
| 7,184,892 B1 | 2/2007 | Dyer |
| 7,333,922 B2 | 2/2008 | Cannon |
| 7,397,392 B2 | 7/2008 | Mahoney et al. |
| 8,280,595 B2 | 10/2012 | Foster et al. |
| 8,469,784 B1 | 6/2013 | Hoskinson |
| 9,330,062 B2 | 5/2016 | Thurow et al. |
| 9,892,376 B2 | 2/2018 | Pfeiffer |
| 10,310,455 B2 | 6/2019 | Bank |
| 10,311,527 B2 | 6/2019 | Pfeiffer |
| 2002/0040300 A1 | 4/2002 | Ell |
| 2002/0103688 A1 | 8/2002 | Schneider |
| 2003/0014171 A1 | 1/2003 | Ma |
| 2003/0161906 A1 | 8/2003 | Braunhardt et al. |
| 2005/0150202 A1 | 7/2005 | Quick |
| 2005/0171660 A1 | 8/2005 | Woolford et al. |
| 2005/0171835 A1 | 8/2005 | Mook et al. |
| 2005/0258259 A1 | 11/2005 | Stanimirovic |
| 2006/0187048 A1* | 8/2006 | Curkendall .......... A01K 11/007 340/572.4 |
| 2006/0241838 A1 | 10/2006 | Mongiardo et al. |
| 2006/0293913 A1* | 12/2006 | Iwig ..................... A01B 79/005 705/39 |
| 2007/0156318 A1 | 7/2007 | Anderson et al. |
| 2007/0192173 A1 | 8/2007 | Moughler et al. |
| 2008/0319927 A1 | 12/2008 | Dellmier et al. |
| 2009/0036184 A1 | 2/2009 | Craessaerts et al. |
| 2009/0259483 A1 | 10/2009 | Hendrickson et al. |
| 2009/0312919 A1 | 12/2009 | Foster |
| 2010/0036696 A1 | 2/2010 | Lang |
| 2010/0153409 A1* | 6/2010 | Joshi ................. G06F 17/30551 707/758 |
| 2010/0199257 A1 | 8/2010 | Biggerstaff |
| 2010/0217631 A1 | 8/2010 | Boss et al. |
| 2011/0251752 A1 | 10/2011 | DeLarocheliere et al. |
| 2011/0270495 A1 | 11/2011 | Knapp |
| 2012/0215395 A1 | 8/2012 | Aznavorian et al. |
| 2012/0253744 A1 | 10/2012 | Schmidt |
| 2012/0260366 A1 | 10/2012 | Heuvelmans |
| 2012/0323453 A1 | 12/2012 | Havimaki et al. |
| 2012/0323496 A1 | 12/2012 | Burroughs et al. |
| 2013/0317872 A1 | 11/2013 | Nakamichi |
| 2014/0019018 A1 | 1/2014 | Baumgarten |
| 2014/0025440 A1 | 1/2014 | Nagda et al. |
| 2014/0089035 A1 | 3/2014 | Jericho |
| 2014/0122147 A1* | 5/2014 | Christie ................ G06Q 50/02 705/7.15 |
| 2014/0129048 A1 | 5/2014 | Baumgarten et al. |
| 2014/0156105 A1 | 6/2014 | Faivre et al. |
| 2014/0188576 A1* | 7/2014 | de Oliveira ...... G06Q 10/06395 705/7.39 |
| 2014/0172247 A1 | 9/2014 | Thomson |
| 2014/0277905 A1 | 9/2014 | Anderson |
| 2015/0046043 A1 | 2/2015 | Bollin et al. |
| 2015/0064668 A1* | 3/2015 | Manci ................ G06Q 10/0639 434/219 |
| 2015/0112546 A1 | 4/2015 | Ochsendorf et al. |
| 2015/0199360 A1 | 5/2015 | Pfeiffer et al. |
| 2015/0178661 A1 | 6/2015 | Keaveny et al. |
| 2015/0199630 A1 | 7/2015 | Pfeiffer et al. |
| 2015/0199637 A1 | 7/2015 | Pfeiffer et al. |
| 2015/0199775 A1 | 7/2015 | Pfeiffer et al. |
| 2015/0366124 A1 | 12/2015 | Kremmer et al. |
| 2016/0078391 A1 | 3/2016 | Blank |
| 2016/0088793 A1 | 3/2016 | Bischoff |
| 2016/0098637 A1 | 4/2016 | Hodel et al. |
| 2016/0202227 A1 | 7/2016 | Mathur et al. |
| 2016/0212969 A1 | 7/2016 | Ouchida et al. |
| 2017/0168501 A1 | 6/2017 | Ogura et al. |
| 2017/0261978 A1 | 9/2017 | Gresch |
| 2017/0322550 A1 | 11/2017 | Yokoyama |
| 2018/0196438 A1 | 7/2018 | Newlin et al. |
| 2018/0359917 A1 | 12/2018 | Blank et al. |
| 2018/0359919 A1 | 12/2018 | Blank et al. |
| 2018/0364652 A1 | 12/2018 | Blank et al. |
| 2018/0364698 A1 | 12/2018 | Blank et al. |

FOREIGN PATENT DOCUMENTS

| | | |
|---|---|---|
| EP | 1714822 A2 | 10/2006 |
| EP | 3346347 A1 | 11/2018 |
| WO | 2013096716 A1 | 6/2013 |
| WO | 2013096721 A2 | 6/2013 |
| WO | 2015153809 A1 | 10/2015 |
| WO | 2016115499 A1 | 7/2016 |
| WO | 2016200699 A1 | 12/2016 |

OTHER PUBLICATIONS

U.S. Appl. No. 14/546,725 Restriction Requirement dated Jan. 9, 2017. 8 pages.

Electronic Fleet Management for Work Truck Fleets. Jun. 20, 2013 2 pages. www.zonarsystems.com.

2013 Buyer's Guide: Fleet Automation Software, http://www.teletrac.com/assets/TT_BuyersGuide_2013.pdf, 10 pages.

Fleet Management: How it works. 2014 Verizon. 3 pages.

International Search Report and Written Opinion for International Application No. PCT/US2014/069541, dated Apr. 15, 2015, date of filing: Dec. 10, 2014, 17 pages.

U.S. Appl. No. 14/155,023, filed Jan. 14, 2014 and drawings, 60 pages.

U.S. Appl. No. 14/271,077, filed May 6, 2014 and drawings, 72 pages.

U.S. Appl. No. 14/445,699, filed Jul. 29, 2014 and drawings, 115 pages.

U.S. Appl. No. 14/546,725, filed Nov. 18, 2014 and drawings, 140 pages.

Office Action for U.S. Appl. No. 14/445,699, dated Jun. 20, 2017, 40 pages.

U.S. Appl. No. 14/545,725 Office Action dated May 26, 2017, 14 pages.

European Search Report Application No. 14879223.7 dated May 22, 2017, 7 pages.

U.S. Appl. No. 14/155,023, Final Office Action, dated Mar. 7, 2017. 40 pages.

U.S. Appl. No. 14/271,077 Office Action dated Jul. 14, 2017, 25 pages.

U.S. Appl. No. 14/155,023 Office Action dated Jul. 20, 2016. 18 Pages.

Final Office Action for U.S. Appl. No. 14/271,077 dated Jan. 25, 2018, 25 pages.

U.S. Appl. No. 14/445,699 Office Action dated Mar. 30. 2018, 61 pages.

U.S. Appl. No. 14/546,725 Office Action dated May 11, 2018, 18 pages.

U.S. Appl. No. 14/445,699 Office Action dated Jul. 20, 2018, 70 pages.

U.S. Appl. No. 14/445,699 Final Office Action dated Mar. 6, 2019, 66 pages.

U.S. Appl. No. 15/626,967 Notice of Allowance dated Jan. 3, 2019, 6 pages.

Extended European Search Report Application No. 18176687.4 dated Nov. 6, 2018, 6 pages.

Chinese Patent Application No. 201480068108.2, dated Oct. 8, 2018, 12 pages.

U.S. Appl. No. 15/980,284 Application and Drawings, filed May 15, 2015, Preliminary Amendment filed May 17, 2018, 219 pages.

U.S. Appl. No. 14/271,077 Prosecution History Oct. 10, 2017 through Jan. 2, 2019. 92 pages.

European Patent Application No. 18176691.6-1217 Extended European Search Report dated Oct. 25, 2018, 8 pages.

(56) References Cited

OTHER PUBLICATIONS

Combine Harvester Instrumentation System for use in Precision Agriculture, Yap Kin, 201, 21 pages.
U.S. Appl. No. 14/445,699 Prosecution History from Nov. 29, 2017 to Nov. 20, 2018, 196 pages.
U.S. Appl. No. 14/546,725 Prosecution History from Aug. 28, 2018 to Jan. 22, 2019, 115 pages.
U.S. Appl. No. 15/626,934 Prosecution History as of Jan. 22, 2019, 88 pages.
U.S. Appl. No. 15/626,967 Prosecution History as of Jan. 22, 2019, 150 pages.
U.S. Appl. No. 15/629,260, filed Jun. 21, 2017, Application and Drawings, 64 pages.
U.S. Appl. No. 15/983,456 Application and Drawings filed May 18, 2018 and Preliminary Amendment filed Jul. 13, 2018, 198 pages.
U.S. Appl. No. 16/246,818 Application and Drawings filed Jan. 14, 2019, 62 pages.
U.S. Appl. No. 14/271,077 Notice of Allowance dated Jun. 19, 2019, 7 pages.
U.S. Appl. No. 14/271,007 Office Action dated Oct. 2, 2018, 10 pages.
U.S. Appl. No. 14/546,725 Office Action dated Oct. 11, 2018, 11 pages.
U.S. Appl. No. 15/626,967 Notice of Allowance dated Jun. 5, 2019, 14 pages.
U.S. Appl. No. 15/625,934 Final Office Action dated Jul. 11, 2019, 34 pages.

* cited by examiner

| | | Units | Worst Day | Lagging Avg | Leading Avg | Best Day | Optimum | Comment |
|---|---|---|---|---|---|---|---|---|
| Faster Grain out of the field | Grain Productivity | Tn/hr | 35.5 | 63.9 | 69.0 | 75.8 | 77.8 | Average |
| | Power efficiency | % Power | 79 | 88 | 87 | 90 | 100 | Good |
| | Harvest spec. power | Kw/tn/hr | 9.30 | 5.47 | 4.97 | 4.17 | | Good |
| Higher Quality of Job Done | Harvest fuel efficiency | l/Tn | 1.77 | 1.30 | 1.16 | 1.00 | 0.91 | Average |
| | Field Transport Eff | l/km | 8.20 | 5.84 | 5.23 | 4.17 | 3.50 | Good |
| | Road Transport Eff | l/km | 3.78 | 2.33 | 1.79 | 1.60 | 1.60 | Good |
| Minimize Unproductive fuel | Idle time | l/day | | 22.0 | 18.0 | | 7.5 | Poor |
| | Waiting to unload | l/day | | | 1.1 | | 0 | Good |
| | Unloading while stationary | l/day | | | | | 0 | Poor |
| Minimize Unproductive time | Idle time | hrs | | | 1.50 | | 0.6 | Poor |
| | Waiting to unload | hrs | | | 0.09 | | 0 | Good |
| | Unloading while stationary | hrs | | | 0.23 | | 0 | Good |

Context:
Average sep hrs/day = 6.5
Average engine hrs/day = 11.1
Number of harvest days = 110

Note:
Grain loss levels were consistently low
Grain quality levels were consistently good

FIG. 14

AGRICULTURAL INFORMATION SENSING AND RETRIEVAL

CROSS-REFERENCE TO RELATED APPLICATION

The present application is continuation-in-part of and claims priority of U.S. patent application Ser. No. 14/546,725, filed Nov. 18, 2014 which is a continuation-in-part of and claims priority of U.S. patent application Ser. No. 14/445,699, filed Jul. 29, 2014 which is a continuation-in-part of and claims priority of U.S. patent application Ser. No. 14/271,077, filed May 6, 2014 which is a continuation-in-part of, and claims priority of U.S. patent application Ser. No. 14/155,023, filed Jan. 14, 2014, the contents of all of which are hereby incorporated by reference in their entirety.

FIELD OF THE DISCLOSURE

The present disclosure relates to mobile equipment. More specifically, the present disclosure relates to identifying performance opportunities to improve performance in the operation of mobile equipment.

BACKGROUND

There is a wide variety of different types of equipment that are operated by an operator. Such equipment can include, for instance, agricultural equipment, construction equipment, turf and forestry equipment, among others. Many of these pieces of mobile equipment have mechanisms that are controlled by the operator in performing operations. For instance, a harvester can have multiple different mechanical, electrical, hydraulic, pneumatic and electromechanical subsystems, all of which need to be operated by the operator. The systems may require the operator to set a wide variety of different settings and provide various control inputs in order to control the combine harvester. Some inputs not only include controlling the combine harvester direction and speed, but also concave spacing, sieve settings, rotor speed settings, and a wide variety of other settings and control inputs.

There are currently some existing methods which allow operators or farm equipment managers to obtain dashboard information indicative of the operation of a piece of agricultural equipment. This information is usually informative in nature.

The discussion above is merely provided for general background information and is not intended to be used as an aid in determining the scope of the claimed subject matter.

SUMMARY

Performance information indicative of operator performance of a mobile machine is detected. Context criteria are identified based on a sensed context of the mobile machine. A set of performance data is parsed to identify reference data, based on the context criteria. A performance opportunity space is identified, by comparing the detected performance information to the reference data. A user interface component is controlled to surface the performance opportunity space for interaction.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 13-18 show various embodiments of mobile devices that can be used in the architectures shown in FIGS. 1, 2, and 7.

DETAILED DESCRIPTION

Figure 1:
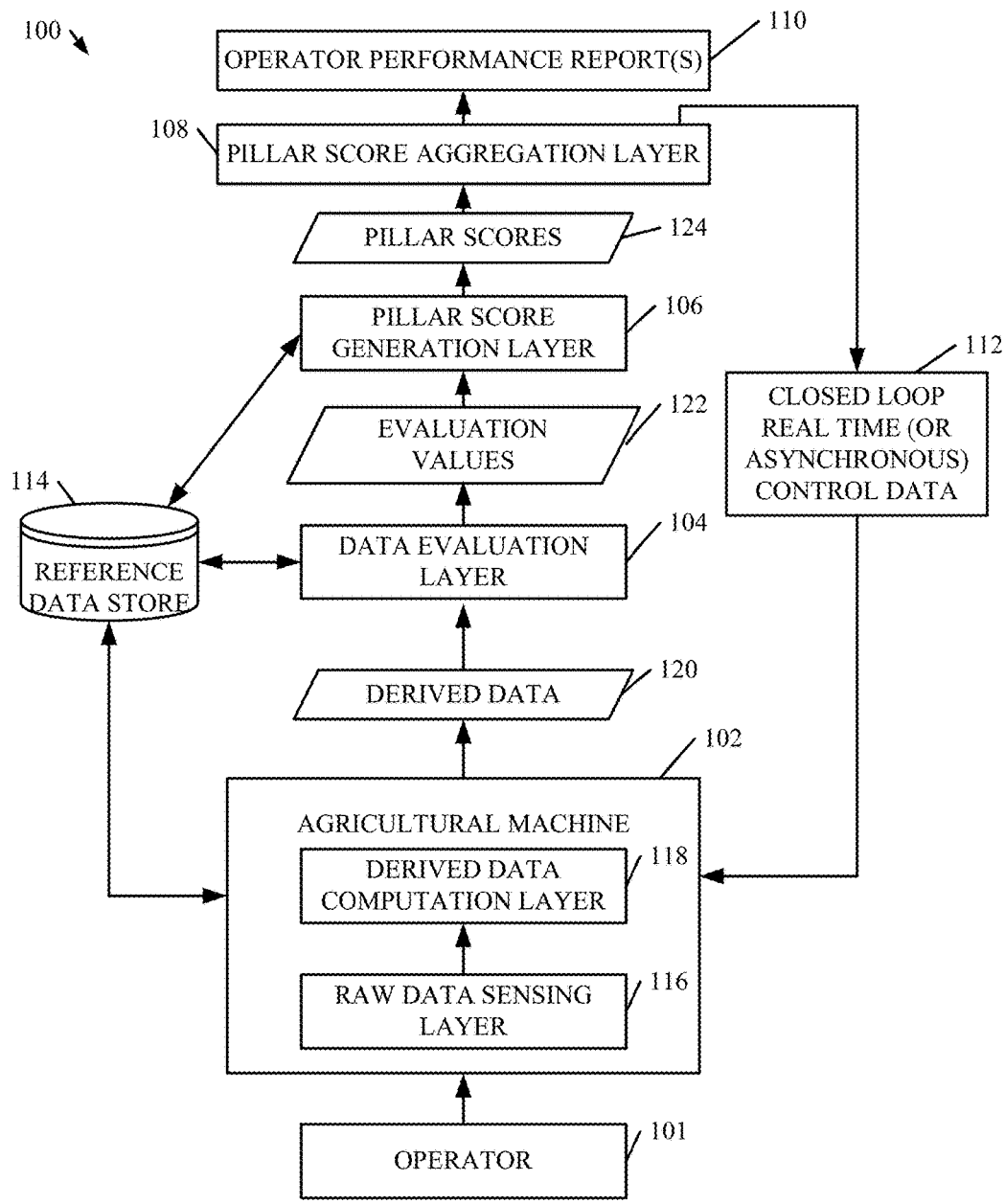
FIG. 1 is a block diagram of one exemplary operator performance computation architecture.

FIG. 1 is a block diagram of one example of an agricultural data sensing and processing architecture 100. Architecture 100 illustratively includes a mobile machine 102, a data evaluation layer 104, a pillar score generation layer 106, and a pillar score aggregation layer 108. Layer 108 generates operator performance reports 110, and can also generate closed loop, real time (or asynchronous) control data 112 which can be provided back to agricultural machine 102. Architecture 100 is also shown having access to a reference data store 114.

In the example shown in FIG. 1, mobile machine 102 is described as being an agricultural machine (and specifically a combine harvester), but this is one example only. It could be another type of agricultural mobile machine as well, such as a tractor, a seeder, a cotton harvester, a sugarcane harvester, or others. Also, it could be a mobile machine used in the turf and forestry industries, the construction industry or others. Machine 102 illustratively includes raw data sensing layer 116 and derived data computation layer 118. It will be noted that layer 118 can be provided on machine 102, or elsewhere in architecture 100. It is shown on machine 102 for the sake of example only.

Raw data sensing layer 116 illustratively includes a plurality of different sensors (some of which are described in greater detail below) that sense machine operating characteristics and parameters as well as environmental data, such as soil moisture, weather, product quality and the type and quality of material being processed and expelled from the agricultural machine 102. The raw data sensor signals are provided from raw data sensing layer 116 to derived data computation layer 118 where some computation can be performed on those sensor signals, in order to obtain derived data 120. In one example, derived data computation layer 118 performs computations that do not require a great deal of computational overhead or storage requirements.

Derived data 120 is provided to data evaluation layer 104. In one example, data evaluation layer 104 compares the derived data 120 against reference data stored in reference data store 114. The reference data can be historical data from operator 101, or from a variety of other sources, such as data collected for operators in the fleet for a single farm that employs operator 101, or from relevant data obtained from other operators as well. One example of generating reference data is described below with respect to FIGS. 6A and 6B. Data evaluation layer 104 generates evaluation values 122 based upon an evaluation of how the derived data 120 for operator 101 compares to the reference data in data store 114.

Evaluation values 122 are provided to pillar score generation layer 106. Layer 106 illustratively includes a set of score calculators that calculate a performance score 124 for each of a plurality of different performance pillars (or performance categories) that can be used to characterize the performance of operator 101 in operating agricultural machine 102. The particular performance pillars, and associated scores 124, are described in greater detail below.

Each of the pillar scores 124 are provided to pillar score aggregation layer 108. Layer 108 illustratively generates a composite score and operator performance reports 110, based upon the various pillar scores 124 that are received for operator 101. The performance reports can take a wide variety of different forms, and can include a wide variety of different information. In one example, reports 110 illustratively include the composite score (which is an overall score for operator 101) indicative of the performance of operator 101, and is based upon the individual pillar scores 124 for the individual performance pillars (or performance categories). It can also illustratively include the individual pillar scores, supporting pillar scores, underlying information, recommendations which are actionable items that can be performed by operator 101, in order to improve his or her performance in operating agricultural machine 102 while considering the included contextual information, and a wide variety of other information.

In one example, layer 108 also generates closed loop, real time (or asynchronous) control data 112 which can be fed back to agricultural machine 102. Where the data is fed back in real time, it can be used to adjust the operation, settings, or other control parameters for machine 102, on-the-fly, in order to improve the overall performance. It can also be used to display information to operator 101, indicating the operator's performance scores, along with recommendations of how operator 101 should change the settings, control parameters, or other operator inputs, in order to improve his or her performance. The data can also illustratively be provided asynchronously, in which case it can be downloaded to the agricultural machine 102 intermittently, or at preset times, in order to modify the operation of machine 102.

Therefore, as described in greater detail below, there may be, for example, three or more different user experiences for the information generated herein, each with its own set of user interface displays and corresponding functionality. The first can be a real time or near real time user experience that displays individual operator performance information for the operator (such as in a native application run on a device in an operator's compartment of the mobile machine 102). This can show, among other things, a comparison of operator performance scores, compared against scores for a reference group. The reference group may be previous scores for the operator himself or herself, scores for other operators in the fleet or scores for other operators in other fleets in a similar context, such as a similar crop, geographic region machine, etc. It can show real time data, recommendations, alerts, etc. These are examples only.

A second user experience can include displaying the information for a remote farm manager. This can be done in near real time and on-demand. It can summarize fleet performance, itself, and it can also display the performance as compared to other reference groups, or in other ways. This can also be in a native application on the farm manger's machine, or elsewhere.

A third user experience can include displaying the information as a fleet scorecard at the end of the season. This experience can show fleet performance and financial impact information. It can show summaries, analysis results, comparisons, and projections. It can generate recommendations for forming a plan for the next season that has a higher operational and financial performance trajectory, as examples.

All of these experiences, and others, can include comparisons at the engineering unit level. For instance, the data underlying any scores or performance metrics can be identified, retrieved, and used in generating the user experience.

Figure 2A:
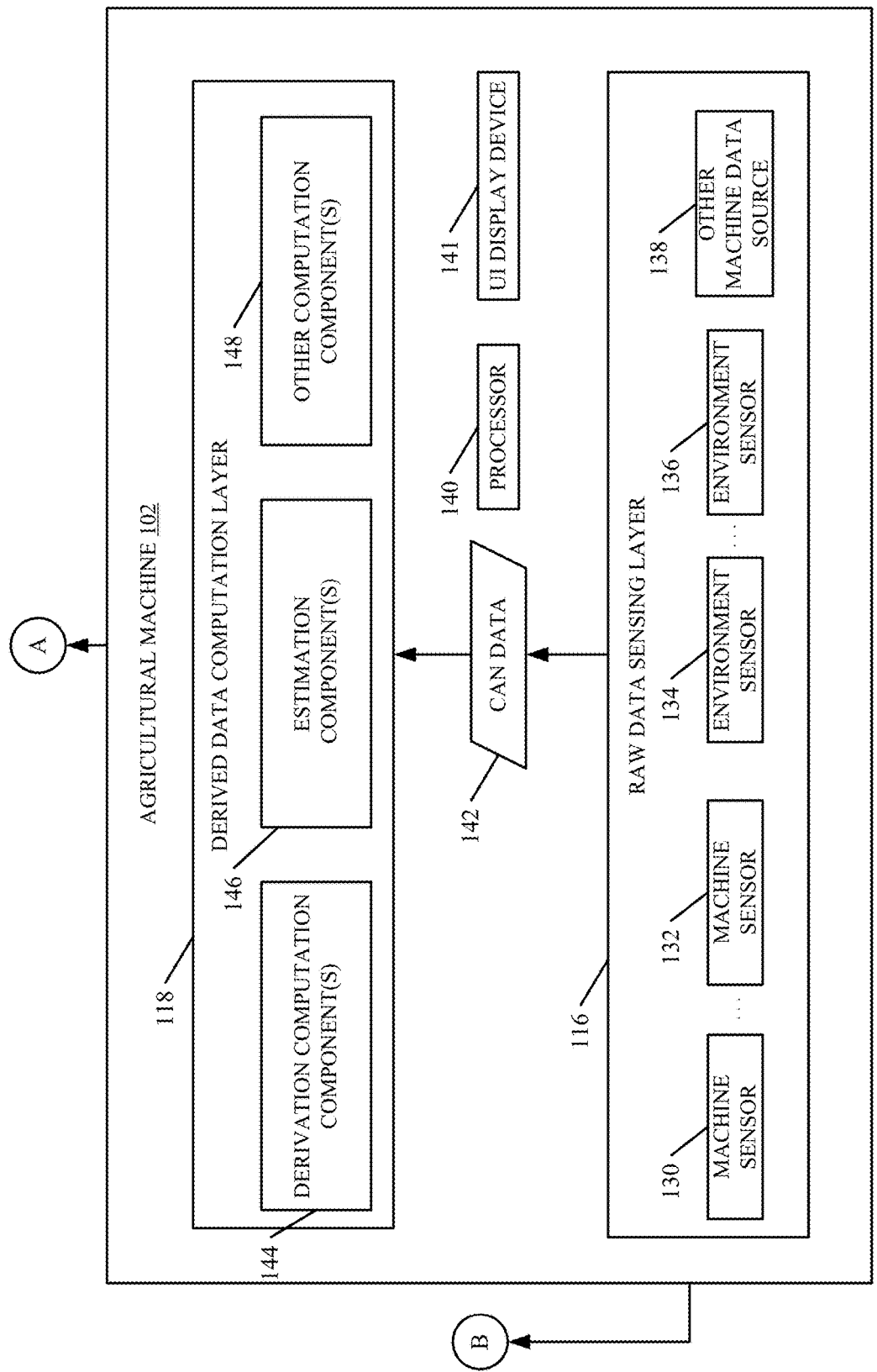
FIGS. 2A and 2B (collectively FIG. 2) is a more detailed block diagram of the architecture shown in FIG. 1.
Figure 2B:
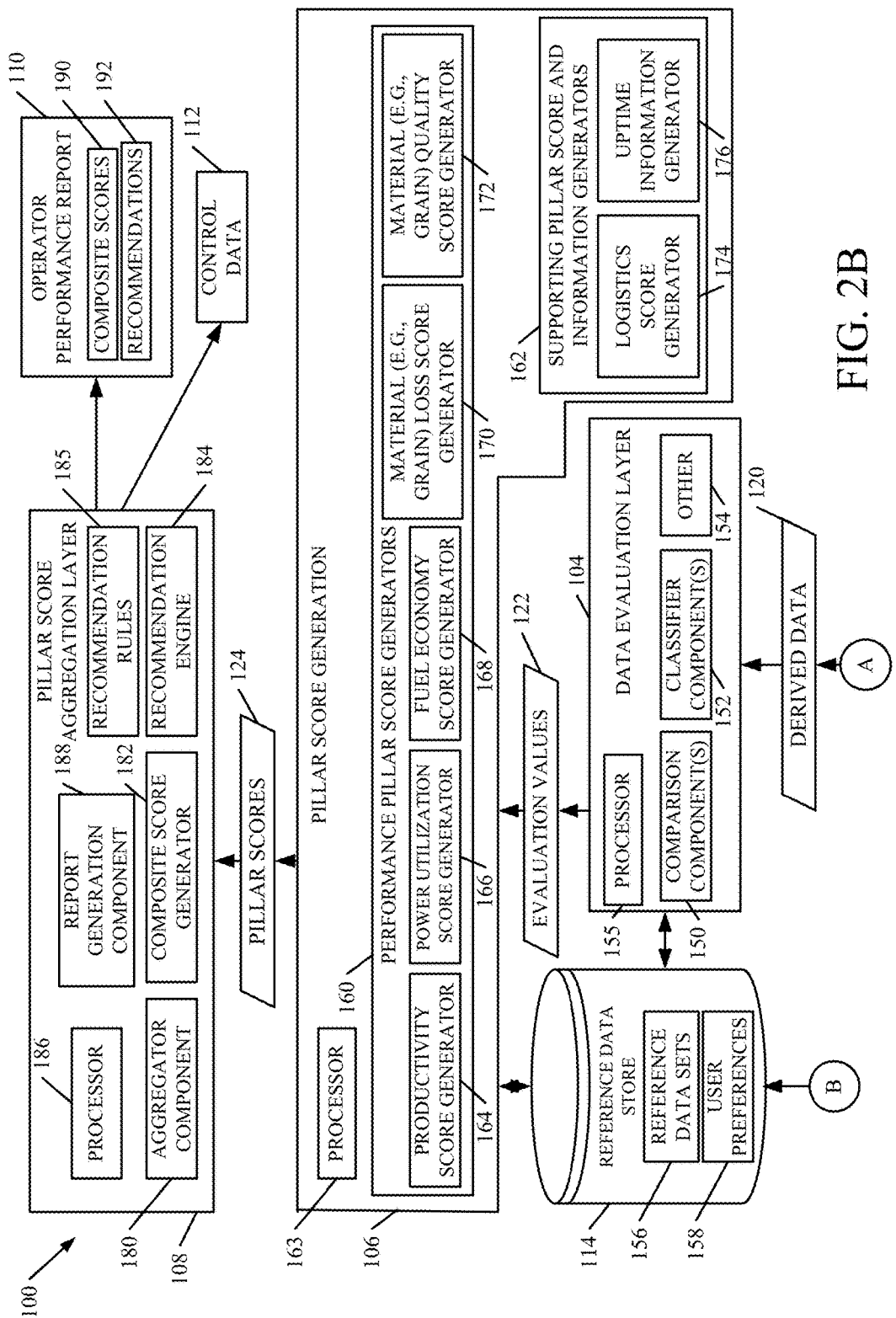

Each of these user experiences can include a set of user interfaces. Those interfaces can have associated functionality for manipulating the data, such as drill down functionality, sort functionality, projection and summarization functionality, among others. Before describing the overall operation of architecture 100, a more detailed block diagram of one example of the architecture will be described. FIGS. 2A and 2B are collectively referred to as FIG. 2. FIG. 2 shows one example of a more detailed block diagram of architecture 100. Some of the items shown in FIG. 2 are similar to those shown in FIG. 1, and are similarly numbered.

FIG. 2 specifically shows that raw data sensing layer 116 in machine 102 illustratively includes a plurality of machine sensors 130-132, along with a plurality of environment sensors 134-136. Raw data sensing layer 116 can also obtain raw data from other machine data sources 138. By way of example, machine sensors 130-132 can include a wide variety of different sensors that sense operating parameters and machine conditions on machine 102. For instance, they can include speed sensors, mass flow sensors that measure the mass flow of product through the machine, various pressure sensors, pump displacement sensors, engine sensors that sense various engine parameters, fuel consumption sensors, among a wide variety of other sensors, some of which are described in greater detail below.

Environment sensors 134-136 can also include a wide variety of different sensors that sense different things regarding the environment of machine 102. For instance, when machine 102 is a type of harvesting machine (such as a combine harvester), sensors 134-136 can include crop loss sensors that sense an amount of crop that is being lost, as opposed to harvested. In addition, they can include crop quality sensors that sense the quality of the harvested crop. They can also include, for instance, various characteristics of the material that is discarded from machine 102, such as the length and volume of straw discarded from a combine harvester. They can include sensors from mobile devices in the operator's compartment, irrigation sensors or sensor networks, sensors on unmanned aerial vehicles or other sensors. Environment sensors 134-136 can sense a wide variety of other environmental parameters as well, such as terrain (e.g., accelerometers, pitch and roll sensors), weather conditions (such as temperature, humidity, etc.), soil characteristic sensors (such as moisture, compaction, etc.) among others. Sensors can also include position sensors, such as GPS sensors, cellular triangular sensors or other sensors.

Other machine data sources 138 can include a wide variety of other sources. For instance, they can include systems that provide and record alerts or warning messages regarding machine 102. They can include the count and category for each warning, diagnostic code or alert message, and they can include a wide variety of other information as well.

Machine 102 also illustratively includes processor 140 and a user interface display device 141. Display device 141 illustratively generates user interface displays (under control of processor 140 or another component) that allows user 101 to perform certain operations with respect to machine 102. For instance, the user interface displays on the device 141 can include user input mechanisms that allow the user to enter authentication information, start the machine, set certain operating parameters or settings for the machine, or otherwise control machine 102.

In many agricultural machines, data from sensors (such as from raw data sensing layer 116) are illustratively communicated to other computational components within machine 102, such as computer processor 140. Processor 140 is illustratively a computer processor with associated memory and timing circuitry (not separately shown). It is illustratively a functional part of machine 102 and is activated by, and facilitates the functionality of, other layers, sensors or components or other items on machine 102. In one example, the signals and messages from the various sensors in layer 116 are communicated using a controller area network (CAN) bus. Thus, the data from sensing layer 116 is illustratively referred to as CAN data 142. It can be communicated using other transmission mechanisms as well, such as near field communication mechanisms, or other wireless or wired mechanisms.

The CAN data 142 is illustratively provided to derived data computation layer 118 where a number of computations are performed on that data to obtain derived data 120, that is derived from the sensor signals included in CAN data 142. Derived data computation layer 118 illustratively includes derivation computation components 144, estimation components 146 and can include other computation components 148. Derivation computation components 144 illustratively calculate some of the derived data 120 based upon CAN data 142. Derivation computation components 144 can illustratively perform fairly straight forward computations, such as averaging, computing certain values as they occur over time, plotting those values on various plots, calculating percentages, among others.

In addition, derivation computation components 144 illustratively include windowing components that break the incoming data sensor signals into discrete time windows or time frames that are processed both discretely, and relative to data in other or adjacent time windows. Estimation components 146 illustratively include components that estimate derived data. In one example components 146 illustratively perform estimation on plotted points to obtain a function that has a metric of interest. The metric of interest, along with the underlying data, can be provided as derived data 120. This is but one example of a computation component 144, and a wide variety of others can be used as well. Other computation components 148 can include a wide variety of components to perform other operations. For instance, in one example, components 148 include filtering and other signal conditioning components that filter and otherwise condition (e.g., amplify, linearize, compensate, etc.) the sensor signals received from raw data sensing layer 116. Components 148 can of course include other components as well.

Regardless of the type of components 144, 146 and 148 in layer 118, it will be appreciated that layer 118 illustratively performs computations that may or may not require relatively light processing and memory overhead. Thus, in one example, layer 118 is disposed on machine 102 (such as on a device located in the cab or other operator compartment of machine 102) or on a hand held or other mobile device that can be accessed on machine 102 by user 101. In another example, derived data computation layer 118 is located elsewhere, other than on machine 102, and processor 140 communicates CAN data 142 to layer 118 using a communication link (such as a wireless or wired communication link, a near field communication link, or another communication link).

Derived data 120 is obtained from layer 118 and provided to data evaluation layer 104. Again, this can be done by processor 140 (or another processor) using a wireless link (such as a near field communication link, a cellular telephone link, a Wi-Fi link, or another wireless link), or using a variety of hard wired links. Data evaluation layer 104 illustratively includes comparison components 150, one or more classifier components 152, and it can include other components 154 as well. It will be appreciated that, in one example, derived data 120 is illustratively associated with a specific user 101 either by processor 140, or in another way. For instance, when user 101 begins operating machine 102, it may be that processor 140 requests user 101 to enter authentication information (such as a username and password, a personal mobile device serial number, a carried token such as an RFID badge, or other authentication information) when user 101 attempts to start up machine 102. In that way, processor 140 can identify the particular user 101 corresponding to CAN data 142 and derived data 120.

Layer 104 includes comparison components 150, classifier components 152, other components 154 and processor 155. Comparison components 150 illustratively compare the derived data 120 for this operator 101 against reference data stored in reference data store 114. The reference data can include a plurality of different reference data sets 156 and it can also include user preferences 158, which are described in greater detail below. The reference data sets can be used to compare the derived data 120 of user 101 against the user's historical derived data, against data for other operators in the same fleet as user (or operator) 101, against data for leading performers in the operator's fleet, against the highest performers in the same context (e.g., crop and geographic region) as the operator 101 (but who are not in the same fleet), or against another set of relevant reference data. In any case, comparison components 150 illustratively perform a comparison of derived data 120 against reference data sets 156. They provide an output indicative of that comparison, and classifier components 152 illustratively classify that output into one of a plurality of different performance ranges (such as good, medium or poor, although these are examples and more, fewer, or different ranges can be used). In one example, for instance, comparison component 150 and classifier components 152 comprise fuzzy logic components that employ fuzzy logic to classify the received values into a good category, a medium category or a poor category, based on how they compare to the reference data. In another example, classifier components 152 provide an output value in a continuous rating system. The output value lies on a continuum between good and poor, and indicates operator performance. In the present description, categories are described, but this is for the sake of example only. These categories indicate whether the performance of user 101, characterized by the received derived data values, indicate that the performance of user 101 in operating machine 102 is good, medium or poor, relative to the reference data set to which it was compared.

The classified evaluation values 122 are then provided to pillar score generation layer 106. In the example shown in FIG. 2, pillar score generation layer 106 includes performance pillar score generators 160, supporting pillar score generators 162 and processor 163. Performance pillar score generators 160 illustratively include generators that generate pillar scores corresponding to performance pillars that better characterize the overall performance of operator 101 in various performance categories. In one example, the pillar scores are generated for productivity, power utilization, fuel economy, material loss and material quality. Supporting pillar score generators 162 illustratively generate scores for supporting pillars that, to some degree, characterize the performance of user 101, but perhaps less so than the pillar scores generated by generators 160. Thus, supporting pillar scores include scores for logistics and uptime. Thus, these measures indicate a relative value that can consider reference data corresponding to similar conditions as those for operator 101.

It can thus be seen that, in the present example, performance pillar score generators 160 include productivity score generator 164, power utilization score generator 166, fuel consumption score generator 168, material (e.g., grain) loss score generator 170, and material (e.g., grain) quality score generator 172. Supporting pillar score generators 162 illustratively include logistics score generator 174 and uptime information generator 176.

As one example, productivity score generator 164 can include logic for generating a score based on an evaluation of a productivity versus yield slope in evaluation values 122.

Power utilization score generator 166 illustratively considers information output by the fuzzy logic classifiers 152 in layer 104 that are indicative of an evaluation of the engine power used by machine 102, under the control of user (or operator) 101. It thus generates a supporting pillar score indicative of that evaluation.

Fuel economy score generator 168 can be a logic component that considers various aspects related to fuel economy, and outputs a score based on those considerations.

By way of example, where machine 102 is a combine harvester, fuel economy score generator 168 can consider the separator efficiency, the harvest fuel efficiency, and non-productive fuel efficiency that are output by the fuzzy logic components in data evaluation layer 104.

Material loss score generator 170 can include items such as the crop type, the measured loss on machine 102 using various loss sensors, an evaluation of the loss using fuzzy logic components, and an evaluation of the tailings, also using fuzzy logic components 152 in data evaluation layer 104. Based upon these considerations, material loss score generator 170 generates a material loss score indicative of the performance of machine 102 (under the operation of user 101) with respect to material loss.

Material quality score generator 172 illustratively includes evaluation values 122 provided by the fuzzy logic components 152 in layer 104 that are indicative of an evaluation of material other than grain that has been harvested, whether the harvested product (such as the corn or wheat) is broken or cracked, and whether the harvested product includes foreign matter (such as cob or chaff), and it can also include evaluation values 122 that relate to the size and quality of the residue expelled from machine 102.

Logistics score generator 174 can include logic that evaluates the performance of the machine 102 during different operations. For instance, it can evaluate the performance of the machine (under the operation of user 101) during unloading, during harvesting, and during idling. It can also include measures such as the distance that the machine traveled in the field and on the road, an individual percentage breakdown in terms of total time, field setup (passes vs. headlands), and other information. This is but one example.

Uptime information generator 176 illustratively generates uptime information (such as a summary) either based on evaluation values 122 provided by layer 104, or based on derived data 120 that has passed through layer 104 to layer 106 or other data. The uptime supporting information can be indicative of the performance of the machine based on how much time it is in each machine state, and it can also illustratively consider whether any alert codes or diagnostic trouble codes were generated, and how often they were generated, during the machine operation. In another example only alerts and diagnostics trouble codes that impact the performance are considered. The uptime information is illustratively provided to (or available to) other items in architecture 100, as context information.

All of the pillar scores and supporting pillar scores (indicated by 124 in FIG. 2) are illustratively provided to pillar score aggregation layer 108. Layer 108 illustratively includes an aggregator component 180, composite score generator 182, recommendation engine 184 (that accesses recommendation rules 185), processor 186 and report generator 188. Aggregator component 180 illustratively aggregates all of the pillar scores and supporting pillar scores 124 using a weighting applied to each score. The weighting can be based on user preferences (such as if the user indicates that fuel economy is more important than productivity), they can be default weights, or they can be a combination of default weights and user preferences or other weights. Similarly, the weighting can vary based upon a wide variety of other factors, such as crop type, crop conditions, geography, machine configuration, or other things.

Once aggregator component 180 aggregates and weights the pillar scores 124, composite score generator 182 illustratively generates a composite, overall score, for operator 101, based upon the most recent data received from the operation of machine 102. Recommendation engine 184 generates actionable recommendations which can be performed in order to improve the performance of operator 101. Engine 184 uses the relevant information, pillar score 124, evaluation values 124 and other information as well as, for instance, expert system logic, to generate the recommendations. This is described in greater detail below with respect to FIG. 4A. The recommendations can take a wide variety of different forms.

Once the composite score and the recommendations are generated, report generator component 188 illustratively generates an operator performance report 110 indicative of the performance of operator 101. Component 188 can access the composite score, the performance pillar scores, all the underlying data, the recommendations, location and mapping information, relevant reference data, and other data. Operator performance report 110 can be generated periodically, at the request of a manager, at the request of operator 101, or another user, it can be generated daily, weekly, or in other ways. It can also be generated on-demand, while operation is on-going. In one example, operator performance report 110 illustratively includes a composite score 190 generated by composite score generator 182 and the recommendations 192 generated by recommendation engine 194. It can include comparisons of the current operator against leading operators in the same context, or other information. Layer 108 can also illustratively generate control data 112 that is passed back to machine 102 to adjust the control of machine 102 in order to improve the overall performance.

The content generated can, in one example, be loaded onto a device so it can be surfaced for viewing in real time by operator 101, in the operating compartment of vehicle 102, or it can be viewed in real time by a farm manger or others, it can be stored for later access and viewing by operator 101 or other persons, or it can be transmitted (such as through electronic mail or other messaging transmission mechanisms) to a main office, to a farm manager, to the user's home computer, or it can be stored in cloud storage. In one example, it can also be transmitted back to a manufacturer or other training center so that the training for operator 101 can be modified based on the performance reports, or it can be used in other ways as well. Further, the format and content can be tailored to the intended audience and viewing conditions.

Figure 3:
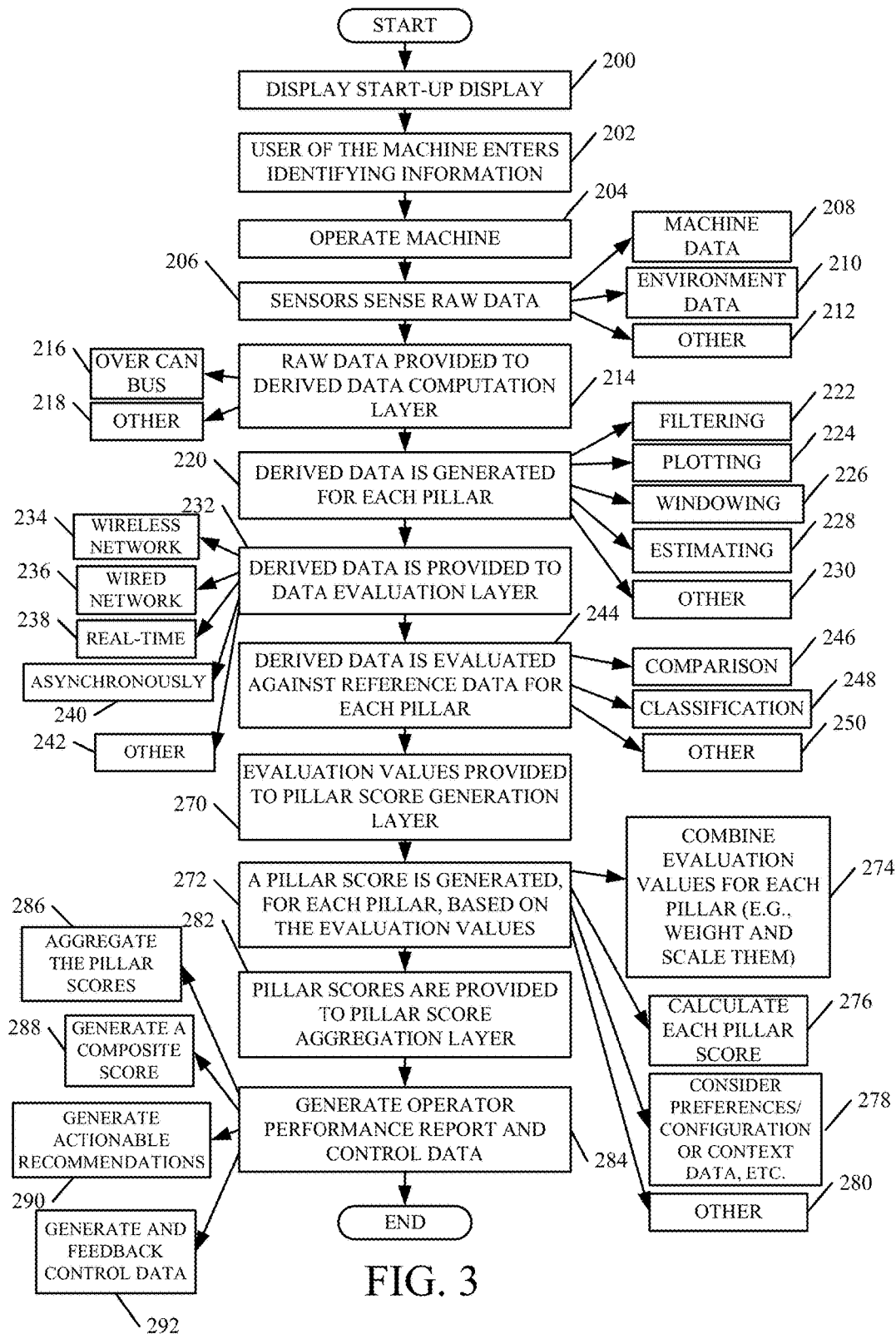
FIG. 3 is a flow diagram illustrating one embodiment of the operation of the architecture shown in FIGS. 1 and 2, in computing performance data indicative of an operator's performance.
Figure 4:
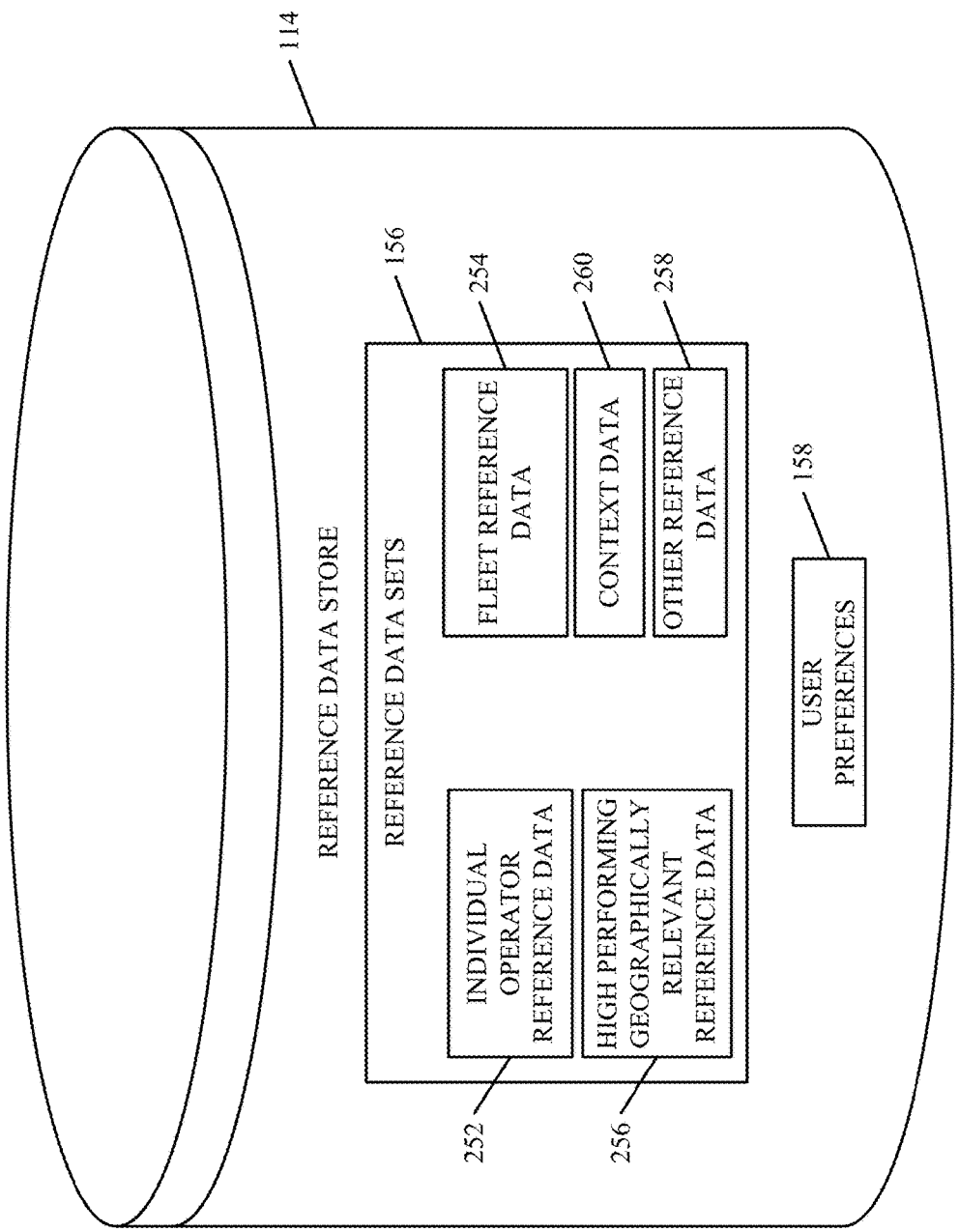
FIG. 4 shows one embodiment of a reference data store in greater detail.

FIG. 3 is a flow diagram illustrating one example of the overall operation of the architecture shown in FIG. 2 in generating an operator performance report 110. FIG. 4 shows one example of a reference data store. FIG. 3 will now be described in conjunction with FIGS. 2 and 4. Then, FIGS. 5A-5G will be described to show a more detailed embodiment of portions of architecture 100 used to generate performance pillar scores.

In one example, processor 140 first generates a startup display on user interface display device 141 to allow user 101 to start machine 102. Displaying the startup display is indicated by block 200 in FIG. 3. The user 101 then enters identifying information (such as authentication information or other information). This is indicated by block 202. User 101 then begins to operate machine 102. This is indicated by block 204.

As user 101 is operating the machine, the sensors in raw data sensing layer 116 sense the raw data and provide signals indicative of that data to derived data computation layer 118. This is indicated by block 206 in the flow diagram of FIG. 3. As briefly discussed above, the data can include machine data 208 sensed by machine sensors 130-132. It can also include environmental data 210 sensed by environment sensors 134-136, and it can include other data 212 provided by other data sources 138. Providing the raw data to derived data computation layer 118 is indicated by block 214 in FIG. 3. As discussed above, this can be over a CAN bus as indicated by block 216, or in other ways as indicated by block 218.

Derived data 120 is then generated by the components 144, 146 and 148 in layer 118. The derived data is illustratively derived so that data evaluation layer 104 can provide evaluation data used in generating the pillar scores. Deriving the data for each pillar is indicated by block 220 in FIG. 3. This can include a wide variety of computations, such as filtering 222, plotting 224, windowing 226, estimating 228 and other computations 230.

The derived data 120 is then provided to data evaluation layer 104 which employs comparison components 150 and the fuzzy logic classifier components 152. Providing the data to layer 104 is indicated by block 232 in FIG. 3. It can be provided using a wireless network 234, a wired network 236, it can be provided in real time as indicated by block 238, it can be saved and provided later (such as asynchronously) 240, or it can be provided in other ways 242 as well.

Data evaluation layer 104 then evaluates the derived data against relevant reference data, to provide information for each pillar. This is indicated by block 244 in FIG. 3. The data can be evaluated using comparison 246, using classification 248, or using other mechanisms 250.

In one example, the comparison components 150 compare the derived data 120 for operator 101 against reference data. FIG. 4 shows a more detailed embodiment of reference data store 114. FIG. 4 shows that, in one example, reference data sets 156 illustratively include individual operator reference data 252. Reference data 252 can illustratively include historical reference data for this specific operator 101. It can also include fleet reference data 254 which comprises reference data corresponding to all of the operators in the fleet to which operator 101 belongs (if operator 101 is in a fleet). It can include high performing relevant reference data 256 as well. This illustratively comprises reference data from other operators in a similar context (e.g., a similar geographically relevant region where the crop type, weather, soil type, field sizes, farming practices, machine being operated, etc. are similar to those of operator 101). It can include performance data for different kinds or models of mobile machine, across various fleets, and the operators that generated the performance data can be identified or anonymous. To generate references for the fuzzy logic components, reference data for medium and poor performing operations is used. However, comparisons can be made against only high performance data or other subsets of data as well. Also, the data can be for individual operators, or it can be aggregated into a single set of reference data (e.g., for all of the high performing operators in the geographically relevant region, or other relevant context etc.). Of course, it can include other reference data 258 as well.

Also, in the example shown in FIG. 4, the reference data sets 156 illustratively include context data 260. The context data can define the context within which the reference data was gathered, such as the particular machine, the machine configuration, the crop type, the geographic location, the weather, machine states, environmental or machine characteristics, other information generated by uptime information generator 176, or other information.

It will be noted that the reference data in store 114 can be captured and indexed in a wide variety of different ways. In one example, the raw CAN data 142 can be stored along with the derived data 120, the evaluation values 122, user preferences 158, the pillar scores 124, context data and the recommendations. The data can be indexed by operator, by machine and machine head identifier, by farm, by field, by crop type, by machine state (that is, the state of the machine when the information was gathered, e.g., idle, idle while unloading, waiting to unload, harvesting, harvesting while unloading, field transport, road transport, headland turn, etc.), by settings state (that is, the adjustment settings in the machine including chop setting, drop settings, etc.), and by configuration state (that is, the hardware configuration of the machine). It can be indexed in other ways as well.

Once evaluation layer 104 performs the comparison against the reference data and classifies a measure of that comparison using fuzzy logic heuristics, the evaluation values 122 represent the results of the classification and are provided to pillar score generation layer 106. This is indicated by block 270 in FIG. 3. Pillar score generation layer 106 then generates a pillar score for each performance pillar (and the logistics supporting pillar), based on the plurality of evaluation values 122. This is indicated by block 272 in FIG. 3.

The pillar scores can be generated by combining the evaluation values for each individual pillar, and weighting and scaling them. Other methods like filtering or related data conditioning might be applied as well. This is indicated by block 274. A pillar score generator then calculates a pillar score for each performance pillar (e.g., each performance category) and supporting pillar (e.g., supporting performance category). This is indicated by block 276 in FIG. 3. In doing so, as discussed above, the pillar score generators can illustratively consider user preferences, machine configuration data, context data (e.g., the information generated by logistics information generator 176), or a wide variety of other context data or other data. This is indicated by block 278. The pillar scores can be generated in other ways 280 as well.

Pillar scores 124 are then provided to pillar score aggregation layer 108. This is indicated by block 282 in FIG. 3. Report generator component 188 then generates the operator performance reports 110 based upon the pillar scores, the composite scores, the underlying data, user preferences, context data and the recommendations, etc. Generating the report 110 and control data 112 is indicated by block 284. Doing this by aggregating the pillar scores is indicated by block 286, generating the composite score is indicated by block 288, generating actionable recommendations is indicated by block 290, and generating and feeding back the control data 112 is indicated by block 292.

Figure 4A:
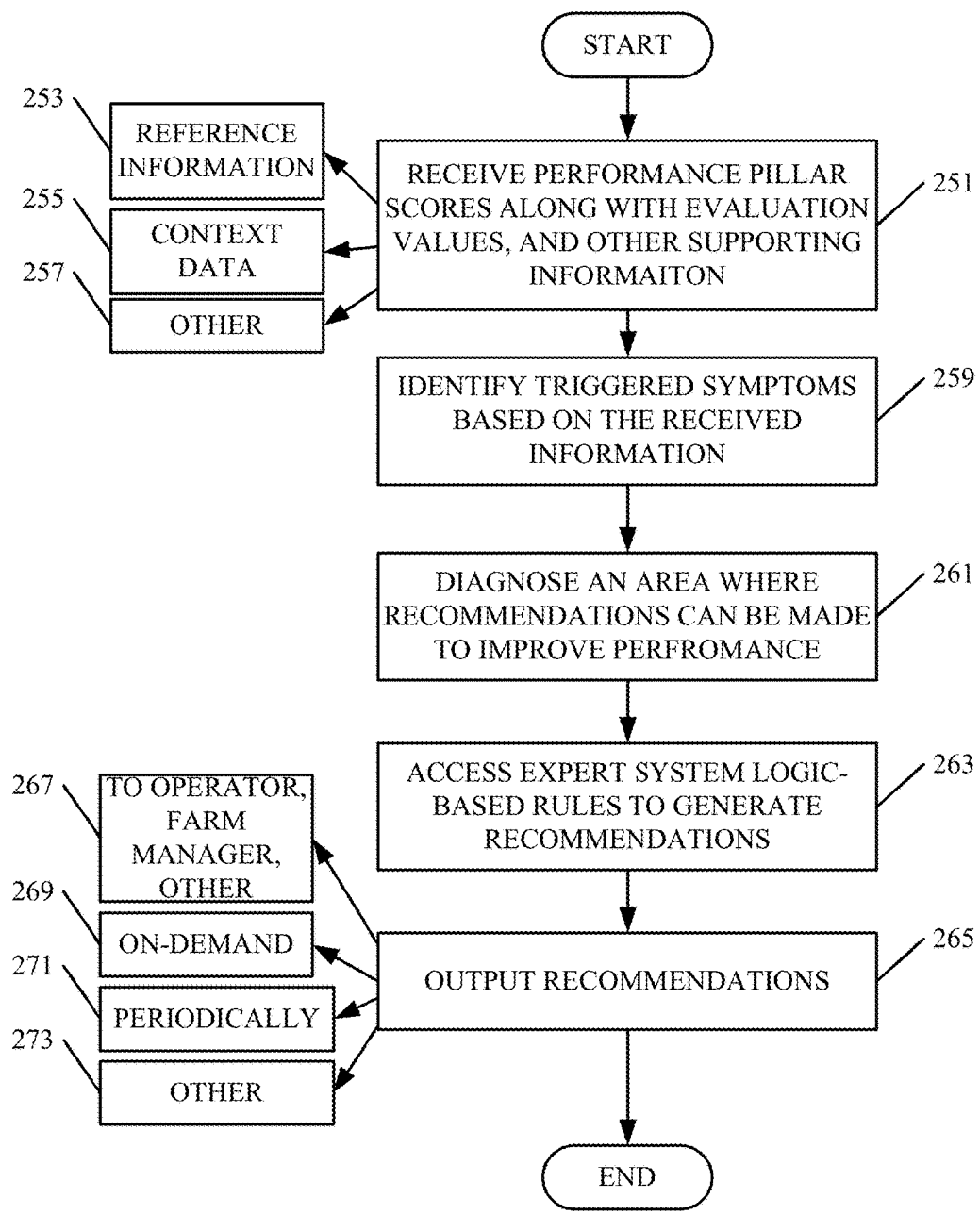
FIG. 4A is a flow diagram illustrating one exemplary embodiment of the operation of a recommendation engine.

Before discussing a more detailed implementation, the operation of recommendation engine 184 in generating recommendations will be described. FIG. 4A is a flow diagram showing one example of this.

FIG. 4A shows a flow diagram illustrating one example of the operation of recommendation engine 184 in FIG. 2. Recommendation engine 184 first receives the performance pillar scores 124, along with the evaluation values 122 and any other desired supporting information from the other parts of the system. This is indicated by block 251 in FIG. 4A. The other data can include reference information 253, context data 255, or a wide variety of other information 257.

Engine 184 then identifies symptoms that are triggered in expert system logic, based on all of the received information. This is indicated by block 259 shown in FIG. 4A.

The expert system logic then diagnoses various opportunities to improve performance based on the triggered symptoms. The diagnosis will illustratively identify areas where recommendations might be helpful in improving performance. This is indicated by block 261 in FIG. 4A.

Engine 184 then accesses expert system, logic-based rules 185 to generate recommendations. This is indicated by block 263. The rules 185 illustratively operate to generate the recommendations based on the diagnosis, the context information and any other desired information.

Engine 184 then outputs the recommendations as indicated by block 265. The recommendations can be output for surfacing by farm managers or other persons, as indicated by block 267. They can be output on-demand, as indicated by block 269. They can be output intermittently or on a periodic basis (e.g., daily, weekly, etc.) as indicated by block 271, or they can be output in other ways as well, as indicated by block 273.

FIGS. 5A-5G show a more detailed implementation of architecture 100, in which machine 102 is a combine harvester. FIGS. 5A-5G each show a processing channel in architecture 100 for generating a pillar score or a supporting pillar score. FIGS. 5A-5G will now be described as but one example of how architecture 100 can be implemented with a specific type of agricultural machine 102.

Figure 5A:
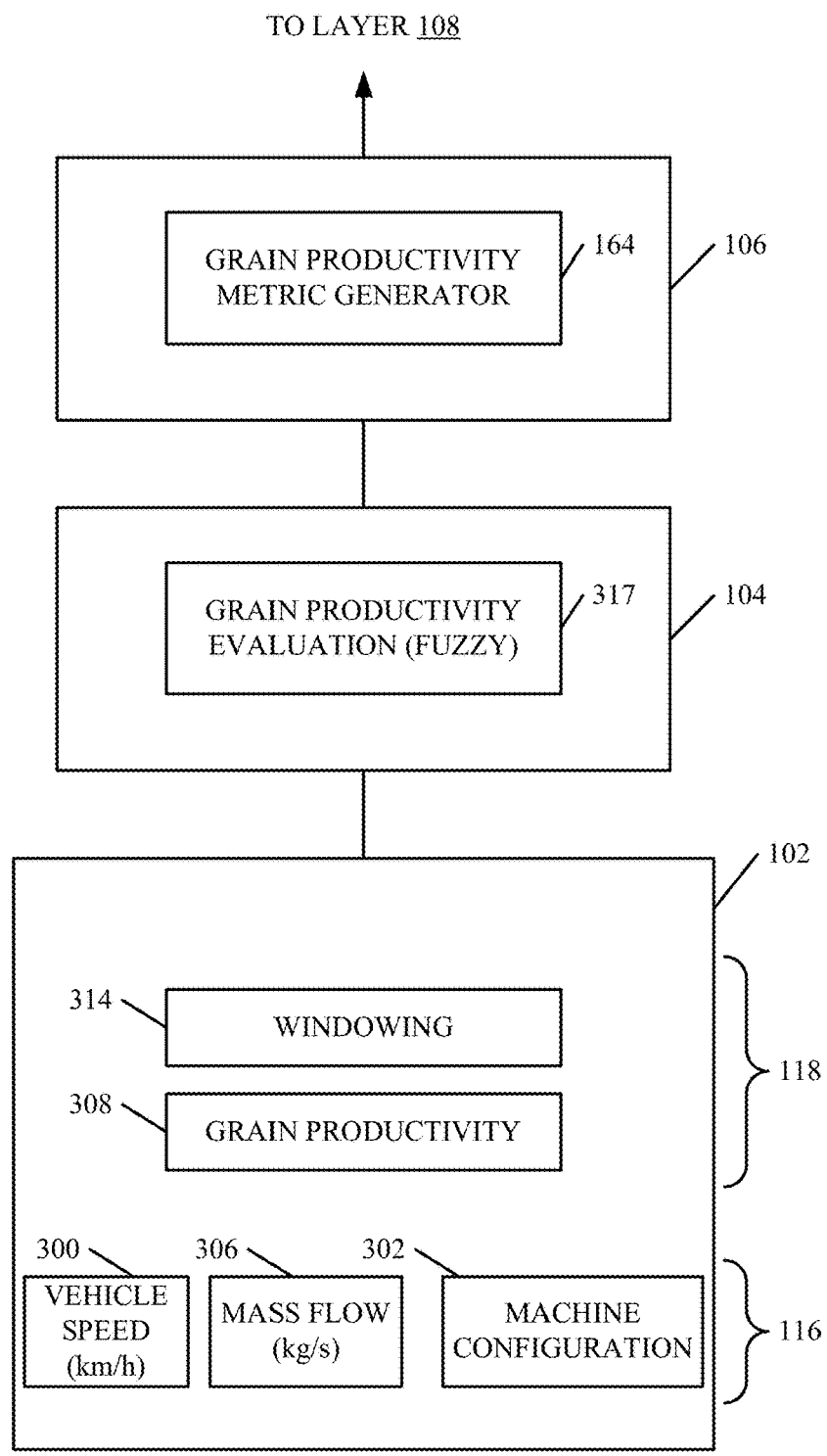
FIGS. 5A-5G are still more detailed block diagrams of different channels for generating different performance pillar scores.

FIG. 5A shows a processing channel in architecture 100 that can be used to generate the productivity pillar score. Some of the items shown in FIG. 5A are similar to those shown in FIG. 2, and they are similarly numbered. In the example shown in FIG. 5A, machine sensors 130-132 in raw data sensing layer 116 illustratively include a vehicle speed sensor 300, a machine configuration identifier 302 and a crop sensor, such as a mass flow sensor 306 that measures mass flow of product through machine 102. The components in derived data computation layer 118 illustratively include components for generating derived data such as a productivity computation component 308 that calculates productivity that indicates the overall grain productivity of machine 102. This can be in tons per hour, tons per hectare or other units or a combination of such metrics. They also include a windowing component 314 that divides the data into temporal windows or time frames and provides it to layer 104.

Evaluation layer 104 illustratively includes a grain productivity fuzzy logic evaluation mechanism 317 that not only compares the output from layer 118 to the various reference data sets 156 in reference data store 114, but also classifies a measure of that comparison. In one example, the output of layer 104 is illustratively a unitless number in a predefined range that indicates whether the operator performed in a good, average or poor range, relative to the reference data to which it was compared. Again, as mentioned above, the good, average or poor categories are examples only. Other outputs such as a continuous metric can be used or more, fewer, or different categories could be used as well.

FIG. 5A also shows that pillar score generation layer 106 illustratively includes a grain productivity metric generator that comprises the productivity score generator 164. Generator 164 receives the unitless output of layer 104 and generates a productivity pillar score 124 based on the input. The productivity score is indicative of the productivity performance of operator 101, based upon the current data. This information is provided to layer 108.

Figure 5B:
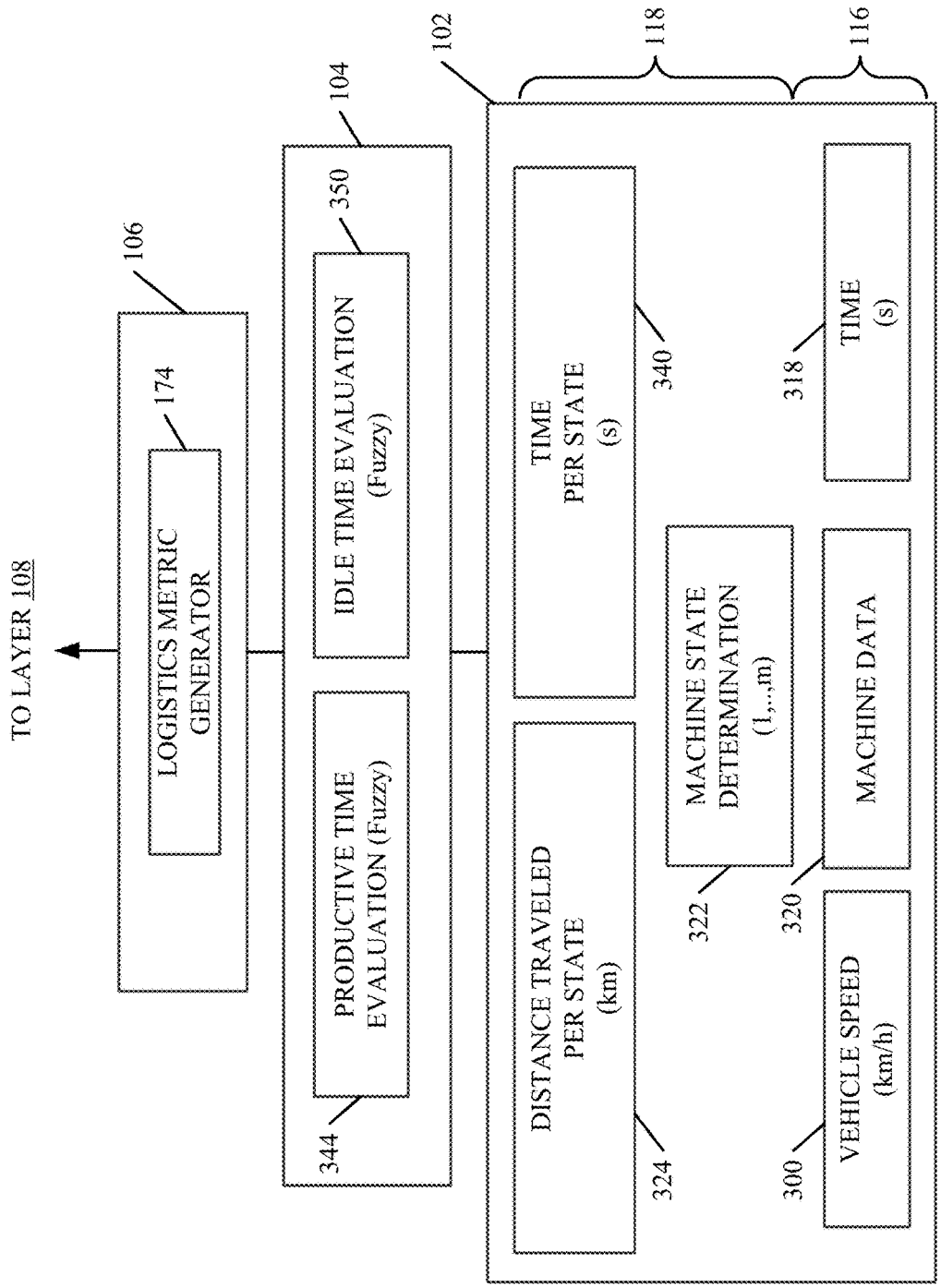

FIG. 5B shows one example of a processing channel in architecture 100 that can be used to generate the logistics supporting pillar score. Some of the items shown in FIG. 5B are similar to those shown in FIG. 2, and they are similarly numbered. FIG. 5B shows that layer 116 includes a time sensor 318 that simply measures the time that machine 102 is running. It also includes machine state data 320 that identifies when machine 102 is in each of a plurality of different states. A vehicle speed sensor 300 is also shown, although it is already described with respect to FIG. 5A. It can also be a separate vehicle speed sensor as well. Derived data computation layer 118 illustratively includes machine state determination component 322. Based on the machine state data received by sensor 320, component 322 identifies the particular machine state that machine 102 resides in, at any given time. The machine state can include idle, harvesting, harvesting while unloading, among a wide variety of others.

Components in layer 118 also illustratively include a plurality of additional components. Component 324 measures the distance machine 102 travels in each traveling state. Component 340 computes the time machine 102 is in each state. The times can illustratively computed in relative percentages or in units of time.

The output of components 324 and 340, are provided to fuzzy logic components 344 and 350 that compares the data provided by components 324 and 340 against reference data for productive time and idle time and evaluates it against that reference data. Again, in one example, the output of the fuzzy logic components is a unitless value in a predetermined range that indicates whether the performance of operator 101 was good, average or poor relative to the reference data. Layer 104 can include other components for generating other outputs, and it can consider other information from layers 116 and 118 or from other sources.

Logistics metric generator 166 illustratively computes a logistics metric, in the example shown in FIG. 5B, based upon all of the inputs illustrated. The logistics metric is a measure of the operator's logistics performance based on the various comparisons against the reference data sets, and it can be based on other things as well.

Figure 5C:
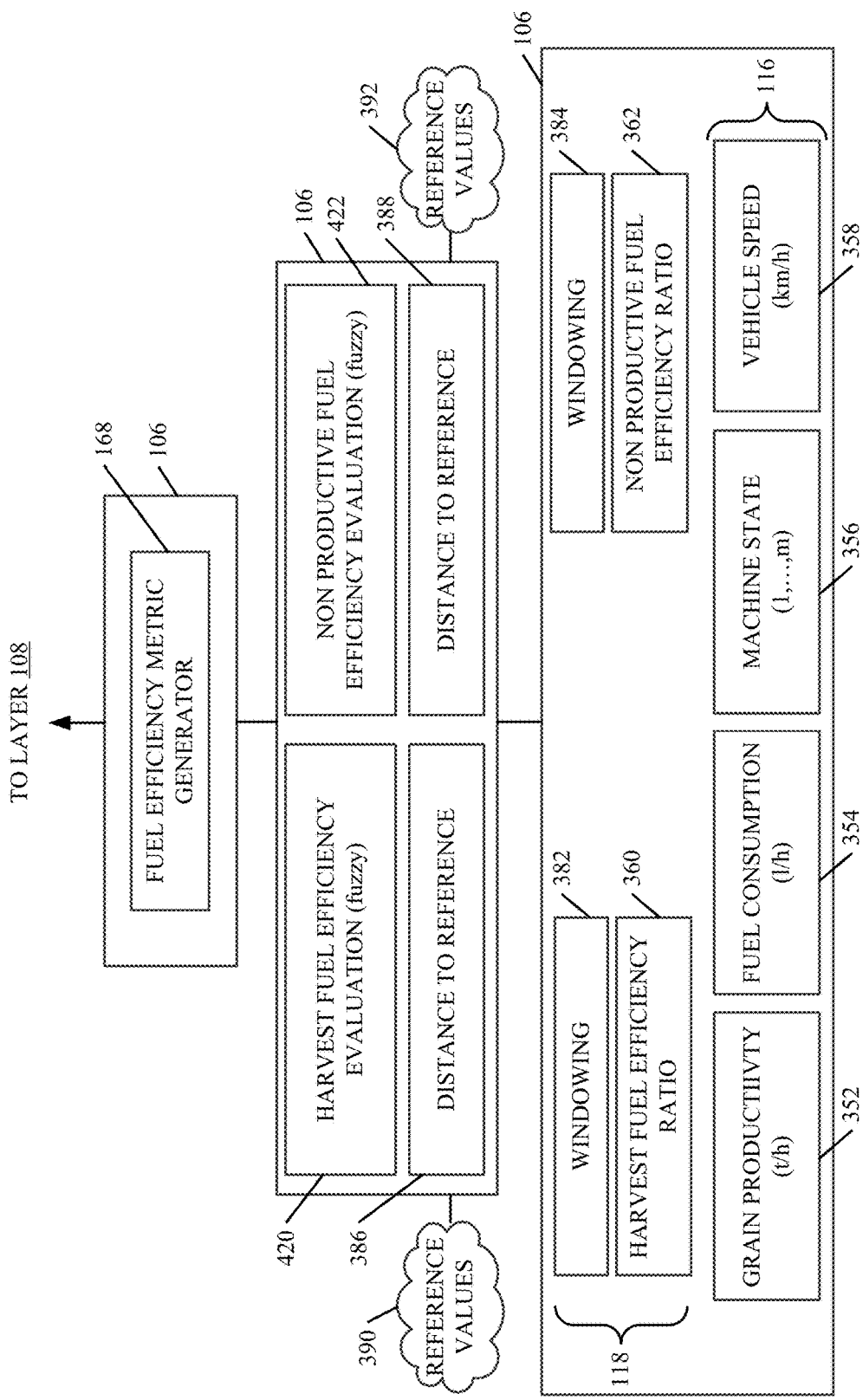

FIG. 5C shows a block diagram of one implementation of a computing channel in architecture 100 for calculating the fuel economy performance pillar score. In the example shown in FIG. 5C, layer 116 illustratively includes a grain productivity sensor (or calculator) 352 that senses (or calculates) grain productivity for the combine harvester (e.g., machine 102). It can be the same as component 308 in FIG. 5A or different. It can provide an output indicative of grain productivity in a variety of different measures or units. It also includes a fuel consumption sensor 354 that measures fuel consumption in units of volume per unit of time. It includes a machine state identifier 356 that identifies machine state (this can be the same as component 322 in FIG. 5B or different), a vehicle speed sensor 358 that measures vehicle speed (which can be the same as sensor 300 in FIG. 5A or different).

Layer 118 includes component 360 that calculates a harvest fuel efficiency ratio for harvesting states and component 362 calculates a non-productive fuel efficiency ratio for non-productive states.

Windowing components 382 and 384 break the data from components 360 and 362 into discrete timeframes. Layer 104 includes average distance components 386 and 388 which receive inputs from reference functions 390 and 392 and output an indication of the distance of the lines fit to the data output by components 382 and 384 from reference functions 390 and 392.

Layer 104 illustratively includes a harvest fuel efficiency evaluator 420, and a non-productive fuel efficiency evaluator 422. Component 420 receives the output from component 386 (and possibly other information) and compares it against reference data, evaluates the measure of that comparison and outputs a value that is indicative of the performance of operator 101 in terms of harvest fuel efficiency. Component 422 does the same thing for non-productive fuel efficiency.

Layer 106 in FIG. 5C illustratively includes a fuel economy metric generator as fuel economy score generator 168 (shown in FIG. 2). It receives the inputs from components 420 and 422 and can also receive other inputs and generates a fuel economy pillar score for operator 101. The fuel economy pillar score is indicative of the fuel economy performance of operator 101, based on the current data collected from machine 102, as evaluated against the reference data.

Figure 5D:
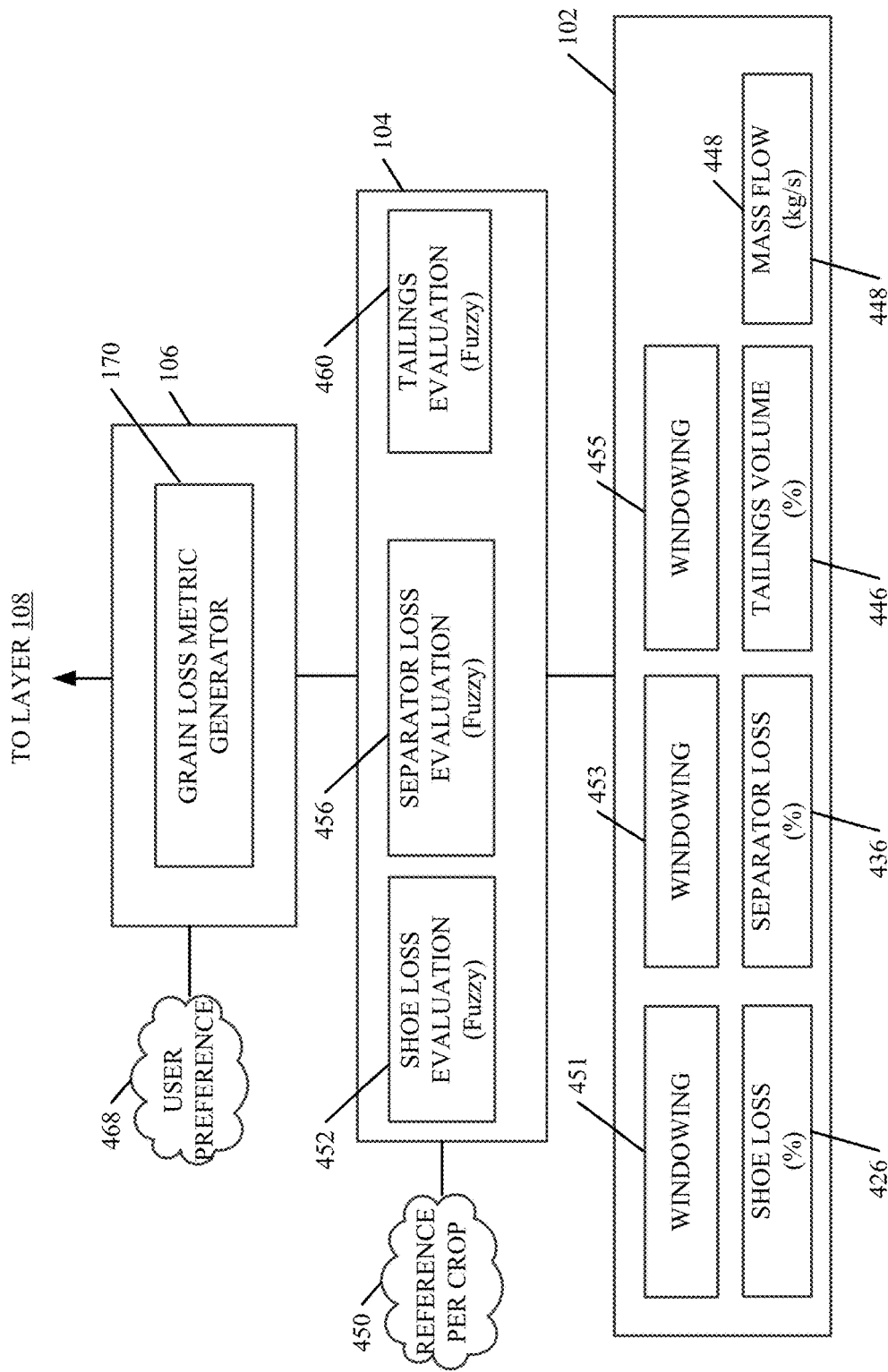

FIG. 5D shows one example of a computing channel in architecture 100 shown in FIG. 2 for calculating the material loss performance pillar score. It can be seen that material loss score generator 170 (from FIG. 2) comprises grain loss metric generator 170 shown in FIG. 5D. In the example shown in FIG. 5D, layer 116 includes a left hand shoe loss sensor component 426 that senses show loss and calculates a total percentage of shoe loss. It also includes separator loss sensor 436 that senses separator loss and computes a total percentage of separator loss, a tailings volume sensor 446 that senses a volume of tailings, and mass flow sensor 448. Sensor 448 can be the same as server 306 in FIG. 5A or different.

Windowing components 451, 453 and 455 receive inputs from components 426, 436 and 448 and break them into discrete time windows. These signals can be filtered and are provided to layer 104. Data evaluation layer 104 illustratively includes shoe total loss evaluator 452, separator total loss evaluator 456, and a tailings evaluator 460.

Total shoe loss evaluator 452 illustratively comprises a fuzzy logic component that receives the total shoe loss from component 451 in layer 118 and compares that against total shoe loss reference data from data store 114. It then evaluates the measure of that comparison to provide a unitless value indicative of whether the performance of operator 101, in terms of total shoe loss, is classified as good, average or poor.

Similarly, total separator loss evaluator 456 comprises a fuzzy logic component that receives the total separator loss from component 453 and compares it against reference data for total separator loss, and then evaluates the measure of that comparison to determine whether the performance of operator 101, in terms of total separator loss, is classified as good, average or poor.

Tailings evaluator 460 is illustratively a fuzzy logic component that receives an input from component 455, that is indicative of tailings volume and perhaps productivity. It then compares those items against tailings reference data in data store 114 and classifies the measure of that comparison into a good, average or poor classification. Thus, component 460 outputs a unitless value indicative of whether the performance of operator 101, in terms of tailings evaluation, is good, average or poor.

It can also be seen in FIG. 5D that, in one example, all of the evaluator components 452, 456 and 460 receive an input from crop type component 450. Component 450 illustratively informs components 452, 456 and 460 of the crop type currently being harvested. Thus, the evaluator components 452, 456 and 460 can consider this in making the comparisons and classifications, relative to reference data.

Grain loss metric generator 170 receives inputs from the various evaluator components in layer 104 and aggregates those values and computes a performance pillar score for material loss. In doing so, generator 170 illustratively considers user preferences 468 that are provided, relative to material loss. These can be provided in terms of a total percentage, or otherwise. They illustratively indicate the importance that the user places on the various aspects of this particular performance pillar. The output of generator 170 is thus an overall material loss performance score that indicates how operator 101 performed in terms of material loss.

Figure 5E:
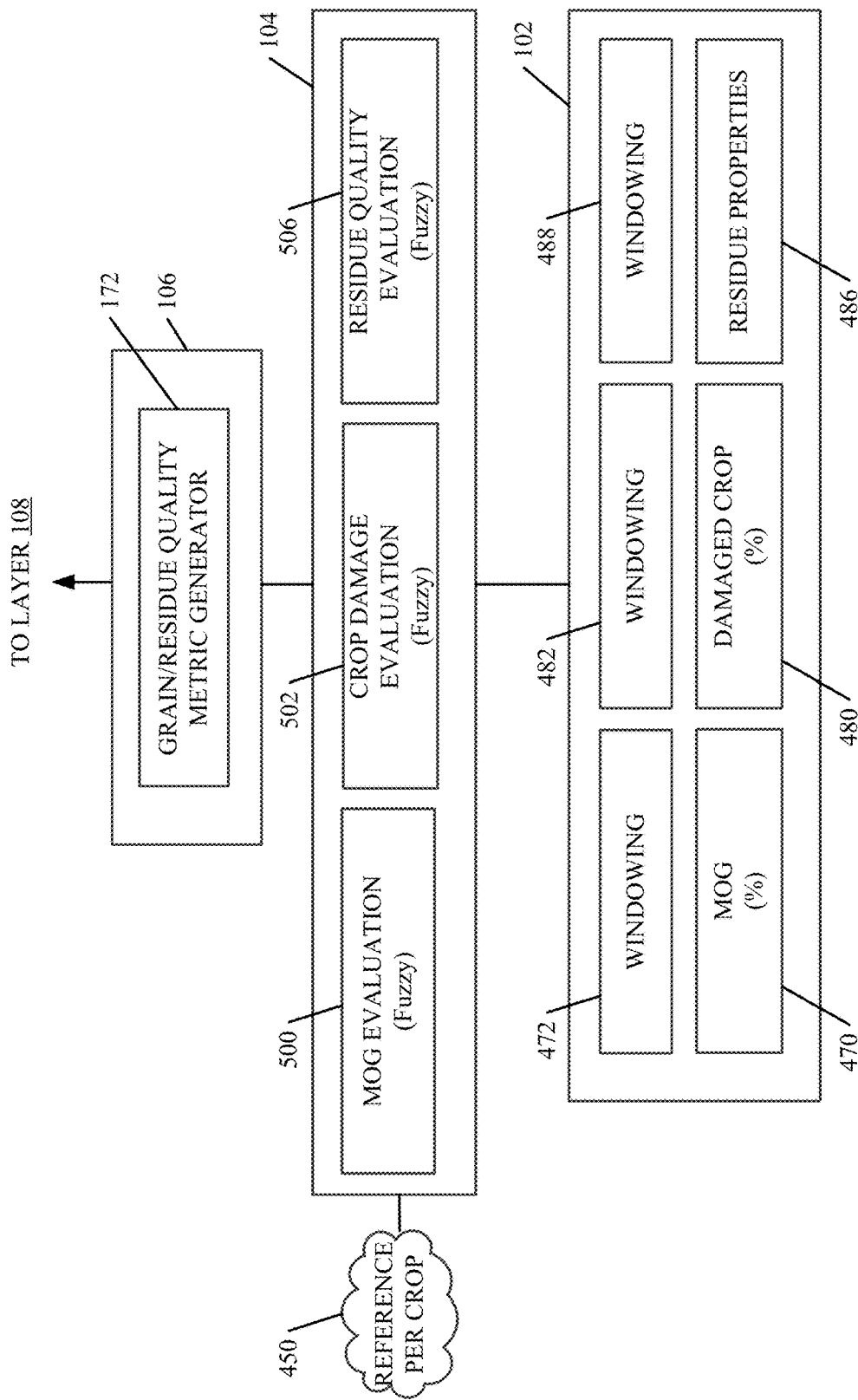

FIG. 5E is a more detailed block diagram showing one example of a computing channel in architecture 100 to obtain a performance pillar score for material quality. Thus, it can be seen that material quality score generator 172 shown in FIG. 2 comprises grain/residue quality metric generator 172 shown in FIG. 5E. FIG. 5E shows that, in one example, raw data sensing layer 116 includes sensor 470 that senses the types of material in the grain elevator. Sensor 470 illustratively senses the volume of material, other than grain, (such as chaff and cobs). Damaged crop sensor 480 illustratively senses the percent of material that is damaged (such as broken, crushed or cracked).

Residue properties sensor 486 can sense various properties of residue. The properties can be the same or different depending on whether the combine harvester is set to chop or windrow.

FIG. 5E shows that derived data computation layer 118 illustratively includes components 472, 482 and 488 that filters the signals from sensors 470, 480 and 486. This can be breaking signals into temporal windows and calculating a representative value for each window or otherwise.

In the example shown in FIG. 5E, data evaluation layer 104 illustratively includes a material other than grain evaluator 500, a crop damage evaluator 502, and a residue quality evaluator 506. It can be seen that components 500, 502 and 508 can all illustratively be informed by user preferences with respect to grain quality thresholds or by reference data 450 for the specific crop type.

In any case, evaluator 500 illustratively receives the input from component 472 in layer 118 and compares the filtered material other than grain value, for light material, against corresponding reference data in data store 114. It then classifies the result of that comparison into a good, average or poor class. The class is thus indicative of whether the performance of operator 101, in terms of material other than grain in the grain elevator, is good, average or poor.

Crop damage evaluator 502 receives the input from component 482 in layer 118 that is indicative of a percent of product in the grain elevator that is damaged. It compares that information against corresponding reference data from reference data store 114 and classifies the result of that comparison into a good, average or poor class. It thus provides a value indicative of whether the performance of operator 101, in terms of the product in the grain elevator being damaged, is good, average or poor.

Residue quality evaluator 506 receives inputs from component 488 in layer 116 and 118 and compares those inputs against corresponding reference data in reference data store 114. It then classifies the result of that comparison into a good, average or poor class. Thus, it provides an output indicative of whether the performance of operator 101, in terms of residue quality, is good, average or poor.

Grain/residue quality metric generator 172 receives inputs from the various components in layer 104 and uses them to calculate a grain/residue quality score for the material quality performance pillar. This score is indicative of the overall performance of operator 101, in operating machine 102, in terms of grain/residue quality. The score is illustratively provided to layer 108.

Figure 5F:
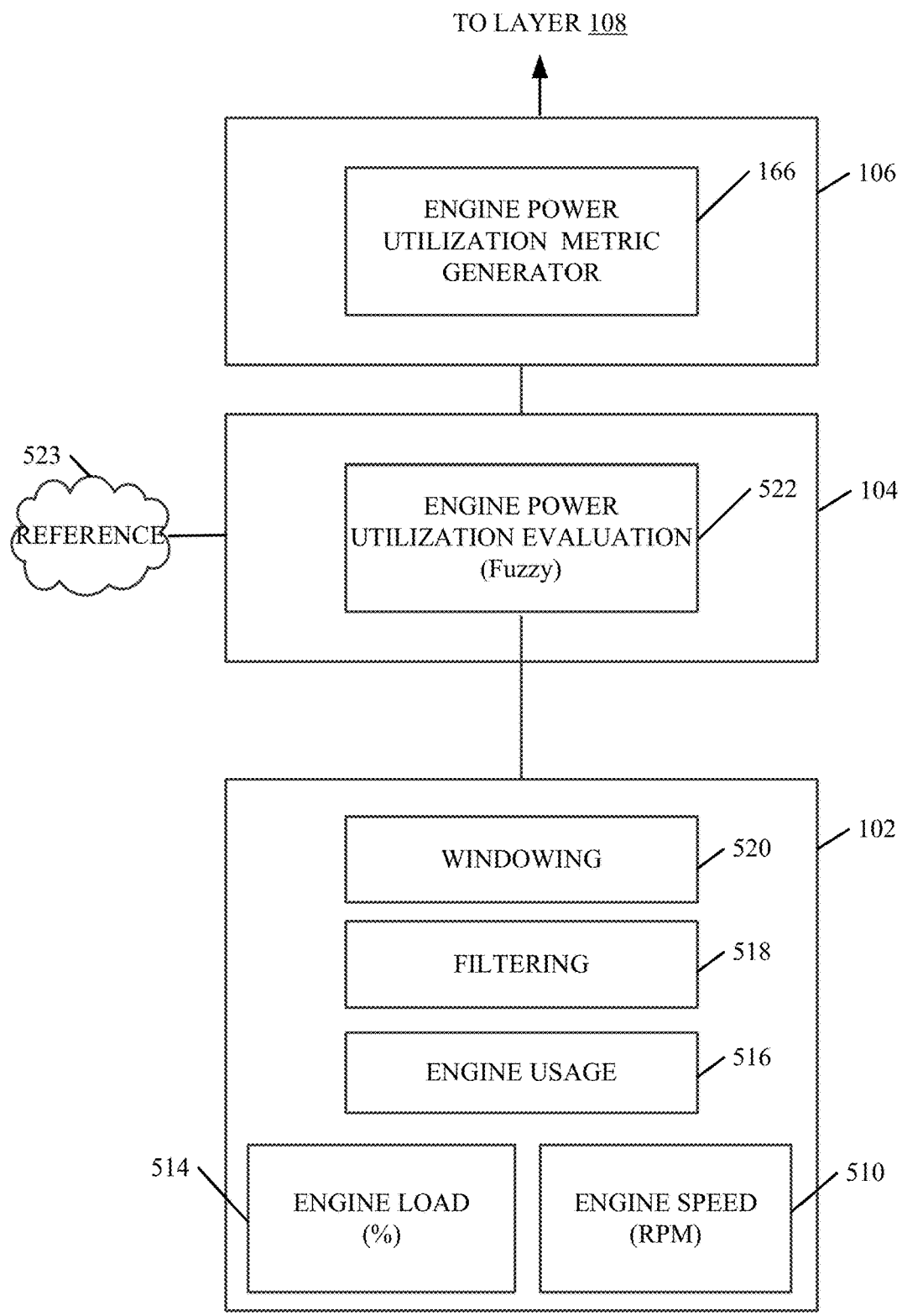

FIG. 5F shows one example of a processing channel in architecture 100 shown in FIG. 2, to calculate the engine power utilization score for the power utilization pillar, on a combine harvester. Thus, power utilization score generator 166 is shown in FIG. 5F. In the example shown in FIG. 5F, raw data sensing layer 116 illustratively includes engine speed sensor 510, and an engine load sensor 514. Layer 118 illustratively includes an engine usage component 516 that receives the inputs from sensors 510 and 514 and calculates engine usage (such as power in kilowatts). Filtering component 518 filters the value from component 518. Windowing component 520 breaks the output from component 518 into discrete temporal windows.

The output from component 520 is provided to layer 104 which includes engine power utilization evaluator 522. Engine power utilization evaluator 522 is illustratively a fuzzy logic component that receives the output from component 520 in layer 118 and compares it against engine power utilization reference data 523 in reference data store 114. It then classifies the result of that comparison into a good, average or poor class. Thus, the output of component 522 is a unitless value that indicates whether the performance of operator 101, in terms of engine power utilization is good, average or poor.

Score generator 174 receives the output from evaluator 522 and calculates a performance pillar score for engine power utilization. The output from component 174 is thus a performance pillar score indicative of whether the overall performance of operator 101, in operating machine 102, is good, average or poor in terms of engine power utilization. The score is illustratively provided to layer 108.

Figure 5G:
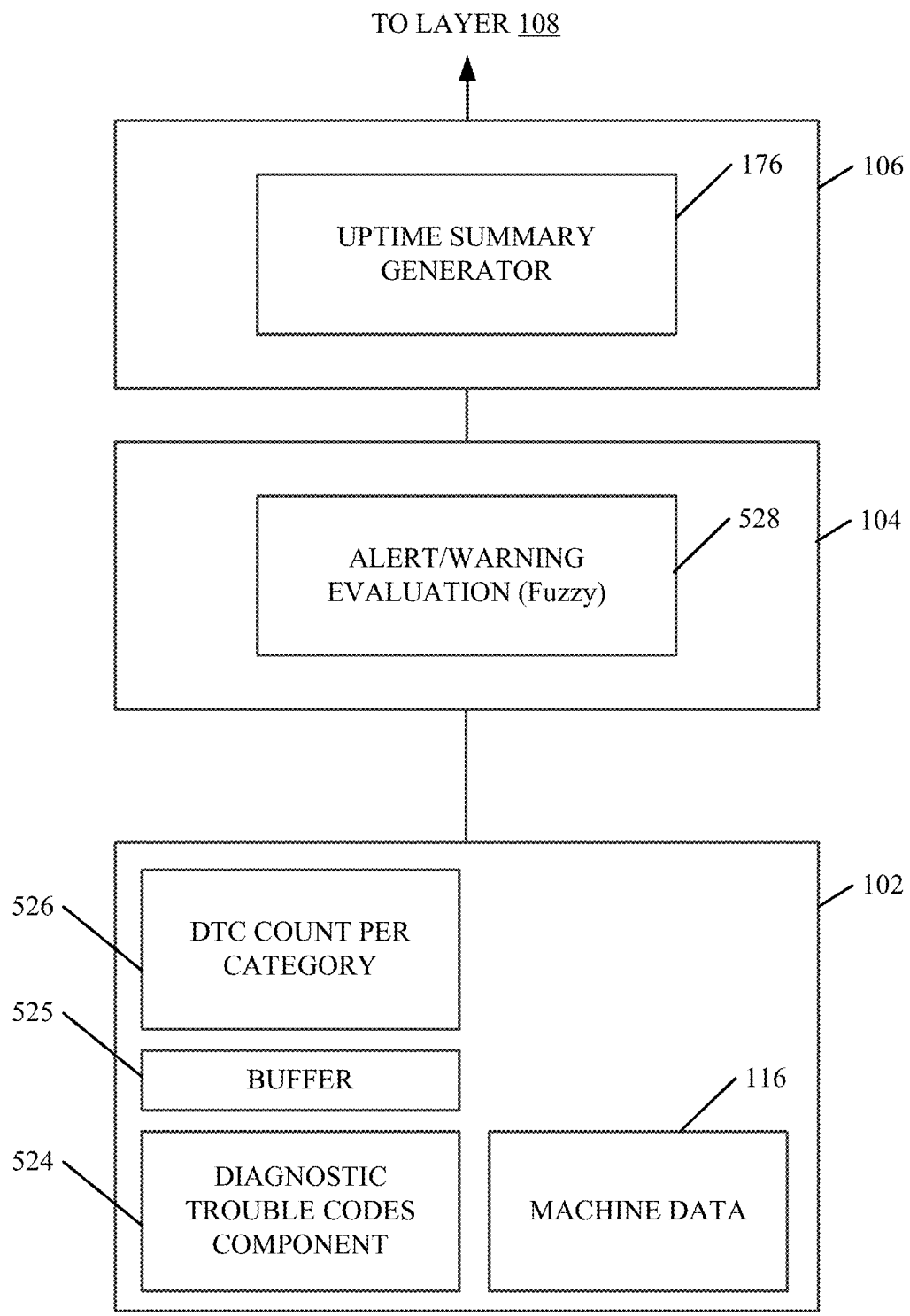

FIG. 5G is a more detailed block diagram showing one example of the architecture 100 shown in FIG. 2 in generating the uptime summary. In the example shown in FIG. 5G, layer 116 includes machine data sensor 116. Machine data sensor 116 illustratively senses a particular machine state that machine 102 is in, and the amount of time it is in a given state. It can also sense other things.

Layer 118 illustratively includes a diagnostic trouble code (DTC) component 524 that generates various diagnostic trouble codes, based upon different sensed occurrences in machine 102. They are buffered in buffer 525. DTC count component 526 calculates the number of DTC occurrences per category, and the number and frequency of occurrence of various alarms and warnings indicated by machine data 116. By way of example, component 526 may calculate the number of times the feeder house gets plugged or the number of other alarms or warnings that indicate that machine 102 is undergoing an abnormally high amount of wear. The alarms and warnings can be event based, time based (such as how many separator hours the machine has used), or based on other things.

Layer 104 includes alert/warning evaluator 528 that compares the various information from machine 102 against reference data to generate information indicative of the operator's performance. The information is provided to summary generator 176.

Uptime summary generator 176 in layer 106 receives the outputs from component 528 and uses them to generate uptime summary information indicative of the performance of operator 101, in operating machine 102, in terms of uptime. The uptime summary information can be provided to layer 108, or used by other parts of the system, or both.

Figure 6A:
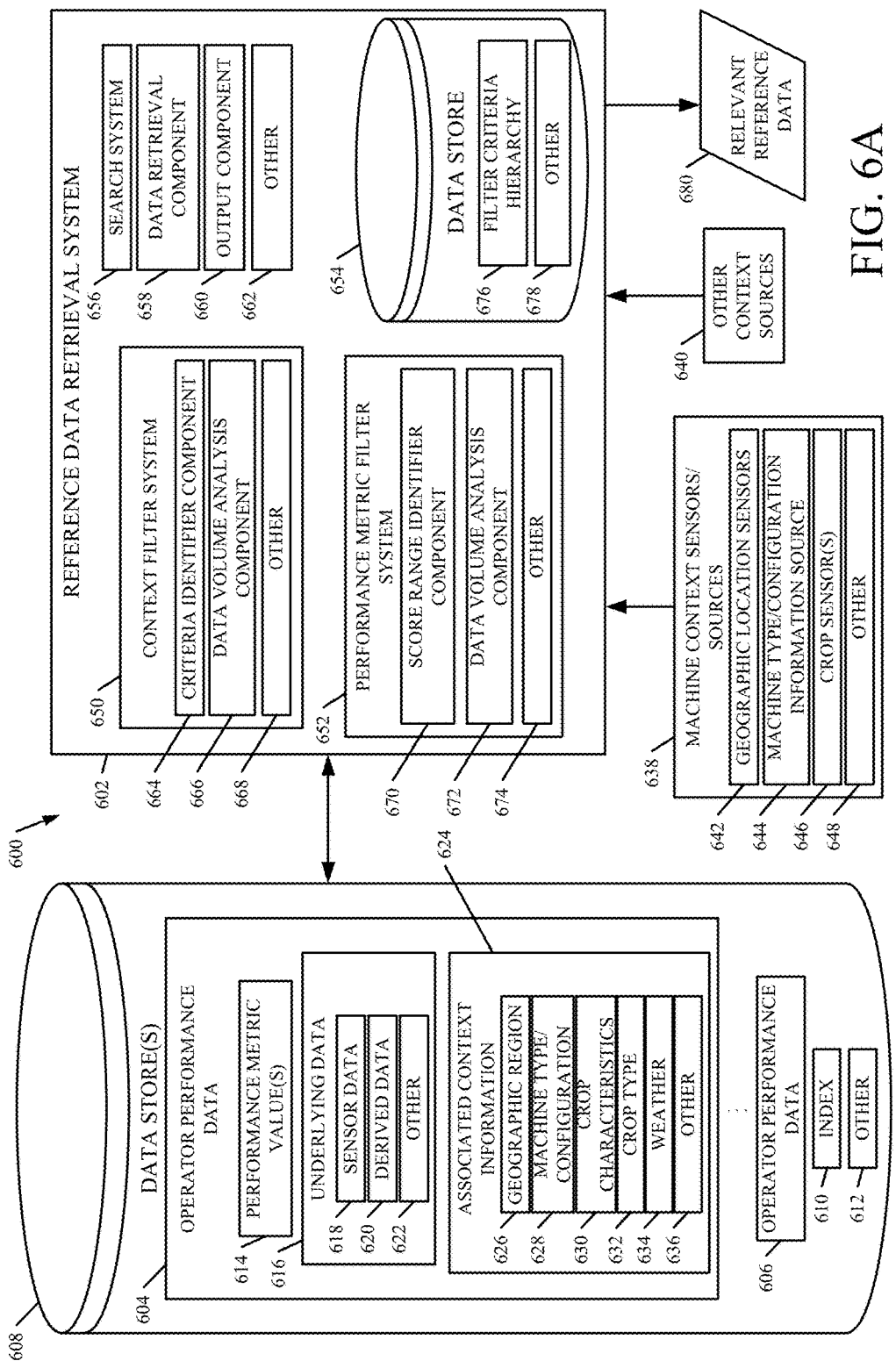
FIG. 6A is a block diagram of one example of a reference data retrieval architecture.
Figure 6B:
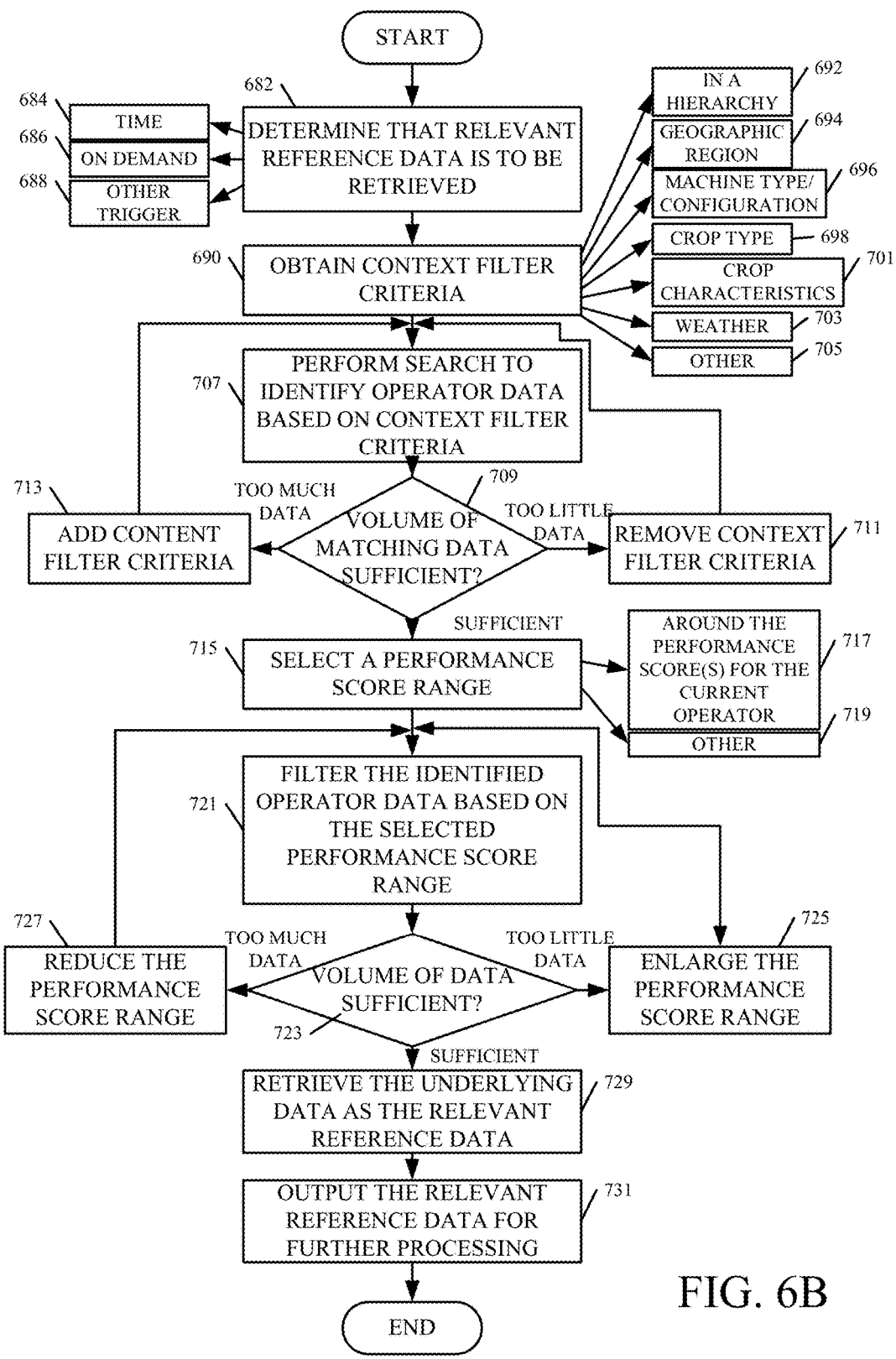
FIG. 6B is a flow diagram showing one example of the operation of the architecture shown in FIG. 6A.

It will be noted that the present discussion describes evaluating data using fuzzy logic. However, this is an example only and a variety of other evaluation mechanisms can be used instead. For instance, the data can be evaluated using clustering and cluster analysis, neural networks, supervised or unsupervised learning techniques, support vector machines, Bayesian methods, decision trees, Hidden Markov models, among others. FIGS. 6A and 6B illustrate that, in one example, a set of reference data can be generated for a given operator 101. The reference data can be data corresponding to a fleet of vehicles to which the operator belongs, or other reference data, such as where the operator is an individual operator and there is no fleet to which to compare. In that case, the operator performance can be compared against performance data for other operators that operate in a similar context. By way of example, there may be other operators in a similar geographic region, operating on a same type of crop, with similar crop characteristics, using a machine that is the same model and configuration as the current operator's machine, etc. Other context information can be used as well. Performance data for a set of operators in a similar context can be used to generate reference data, against which the current operator's performance can be compared.

FIG. 6A is a block diagram of one example of a reference data retrieval architecture 600. FIG. 6A shows that a reference data retrieval system 602 accesses operator performance data 604-606 in one or more data stores 608. Data stores 608 can include reference data store 114 discussed above or other data stores. Data stores 608 can also include an index 610 that indexes the various operator performance data 604-606 by context data, or other information. Data store 608 can include other data records 612, as well.

In the example shown in FIG. 6A, operator performance data 604 for a given operator includes a performance metric value 614, which may be one or more of the performance scores (e.g., pillar scores 124, composite scores 190, etc.) discussed above or other scores. It also illustratively includes the underlying data 616 from which the performance metric value 614 was determined. This can include sensor data 618, derived data 620 or a variety of other data 622. Each performance metric value (or set of values) for a given operator also illustratively includes associated context information 624. The context information identifies a context within which a given operator was operating, when the performance metric value or values 614 were generated. The context information can include a wide variety of different types of information. For instance, it can include a geographic region 626 where the operator was operating. It can include the machine type and configuration (such as the machine brand, model identifier, an indication of the machine configuration, and/or machine settings, etc.). The machine type and configuration data is indicated by block 628. It can include an indication of the crop type 630 upon which the operator was operating, and any of a wide variety of different crop characteristics 632. Such characteristics can include, for instance, crop moisture, whether the crop was lodged or otherwise oriented in an unusual way, or a wide variety of other crop characteristics. The context information 624 can also include an indication of the weather 634, such as wind conditions, whether it is raining, whether the soil is moist, etc. The associated context information can include a wide variety of other information 636 as well, and that described above is described for the sake of example only.

Reference data retrieval system 602 illustratively obtains context information for the context of the current operator 101 from one or more machine context sensors/sources 638 and/or one or more other sources of context information 640. Machine context sensors/sources 638 can, for instance, include any of the sensors discussed above such as a geographic location sensor 642 (such as a GPS receiver), sources of machine type/configuration information 644, one or more crop sensors 646 that sense the crop type and crop characteristics, etc. The sensors/sources 638 can include a wide variety of other sensors 648 as well. It should also be noted that, instead of sensing the context information, the information can also be input by the user. For instance, the user can provide a user input indicative of the crop type, the weather conditions, the machine model and configuration, etc. Similarly, other context sources 640 may provide other context information, such as weather conditions, topology maps, or a wide variety of other context information.

In the example shown in FIG. 6A, reference data retrieval system 602 illustratively includes context filter system 650, performance metric filter system 652, data store 654, search system 656, data retrieval component 658, output component 660, and it can include a wide variety of other items 662, as well. Context filter system 650 includes criteria identifier component 664, data volume analysis component 666, and it can include other items 668. Performance metric filter system 652 illustratively includes score range identifier component 670, data volume analysis component 672, and it can include other items 674. Data store 654 can include a filter criteria hierarchy 676 and other data 678.

Before describing the operation of architecture 600 in detail, a brief overview will first be provided. Context filter system 650 first receives the context information for the current operator from machine context sensors/sources 638 and/or other context sources 640. It identifies a set of filter criteria which it can use in searching data store 608 to identify other operators, that operated in similar contexts as the present operator, so that the performance data for the identified operators can be used as reference data. It uses search system 656 to identify the operators for which performance data is stored in data store 608, that operated in a similar context. Performance metric filter system 652 then filters that data to obtain reference data where the performance metric values 614 in the reference data can be limited to a predefined distance of the performance metric value calculated for the current operator 101. Data retrieval component 658 then retrieves the underlying data 616 for the operators within that range, and this information, along with the performance metric values 614 and associated context information 624 (if desired) is illustratively output as relevant performance data 680.

FIG. 6B is a flow diagram illustrating one example of the operation of architecture 600, in more detail. FIGS. 6A and 6B will now be described in conjunction with one another.

Reference data retrieval system 602 first determines that relevant reference data is to be retrieved. This is indicated by block 682 in FIG. 6B. This can be done intermittently, or periodically, or on another time basis 684. It can also be done on demand, such as when an operator, a supervisor, etc. requests that reference data be identified. This is indicated by block 686. It can be done based on other triggers as well, as indicated by block 688.

Criteria identifier component 664 in context filter system 650 then identifies or obtains a set of context filter criteria with which to select a set of performance data from data store 608. This is indicated by block 690. In one example, the context information is arranged according to a filter criteria hierarchy 676. For instance, it may be that some of the context information is more important, under certain circumstances, in identifying relevant reference data, than other context information. Therefore, the context information can be arranged according to hierarchy 676. Also, in one example, hierarchy 676 may be configurable by the operator, by an administrator, or it may be predefined. It also may change based upon the crop type, the machine, the geographic region, or based on other reasons.

In any case, criteria identifier component 664 identifies a set of filter criteria with which to filter the performance data stored in data store 608, to identify reference data. Identifying the criteria from a hierarchy is indicated by block 692. The criteria can be a wide variety of different types of information, such as geographic region 694, machine type, configuration or settings 696, crop type 698, crop characteristics 701, weather 703, or a wide variety of other criteria 705. Context filter system 650 then uses search system 656 to search through data store 608, using the identified context filter criteria, as a filter. In doing so, search system 656 can search data store 608 using index 610 or otherwise. Performing a search to identify operator data based on the context filter criteria is indicated by block 707.

Data volume analysis component 666 then determines whether the volume of data returned in response to the first search is sufficient so that the reference data will provide a statistically significant reference data set. This can be done using a variety of different statistical or other measures, and it is indicated by block 709. If the data set is not large enough, then criteria identifier component 664 removes some of the filter criteria previously selected so that more data will be identified in the search results. This is indicated by block 711. Processing then reverts to block 707 where another search is performed.

If the data set is too large, so that processing latency suffers, or for other reasons, then criteria identifier component 664 can add filter criteria as indicated by block 713. Again, this can be done by accessing the criteria hierarchy, or otherwise. Processing again reverts to block 707.

Once a sufficient amount of matching data has been returned in response to the search based on the reference criteria, then score range identifier component 670 selects a performance score range relative to the performance metric score calculated for the present operator 101. This is indicated by block 715. In one example, the range can be a window around the performance score for the current operator, as indicated by block 717. The range can be defined in other ways as well, such as performance scores above the current operator's performance score, or those preferentially favoring scores above, but including some scores below, etc. Identifying the score range in other ways is indicated by block 719.

Performance metric filter system 652 then controls search system 656 to filter the search results previously returned based on the context filter criteria search, using the selected performance score range. This is indicated by block 721. For instance, if the search results returned based on the context criteria include performance scores that are well below the current operator's performance score, then the performance data for those operators may be excluded or filtered out of the data set. The same is true of performance scores that are much higher than the performance score of the current operator 101. The search results are thus filtered based upon the selected performance score range.

Data volume analysis component 672 then determines whether the volume of data returned after applying the performance score range filter is sufficient. This is indicated by block 723. Again, it can determine the sufficiency of the data by determining whether the amount of data is sufficient so that the underlying performance information will provide a statistically significant reference data set. It can do this using a wide variety of metrics or mechanisms.

If there is not enough data, then score range identifier component 670 enlarges the range of scores to be included in the reference set. This is indicated by block 725. If there is too much data, component 670 narrows the range of scores that will be included, as indicated by block 727. In either case, processing reverts to block 721 where the new score range is used to filter the search results returned in the context criteria search.

Once a sufficient volume of filtered data has been obtained, then data retrieval component 658 retrieves the underlying data 616 for that data set, as the relevant reference data. This is indicated by block 729. The relevant reference data is then output for further processing as indicated by block 731. The relevant reference data may include the underlying data 616, such as data in engineer units, or other data. It can include the performance metric values 614 and any associated context information, or other information.

It can thus be seen that the architecture 600 can identify relevant reference data for an operator 101, even if the operator has only a single machine and is independent of any other fleets or other operators.

Figure 7:
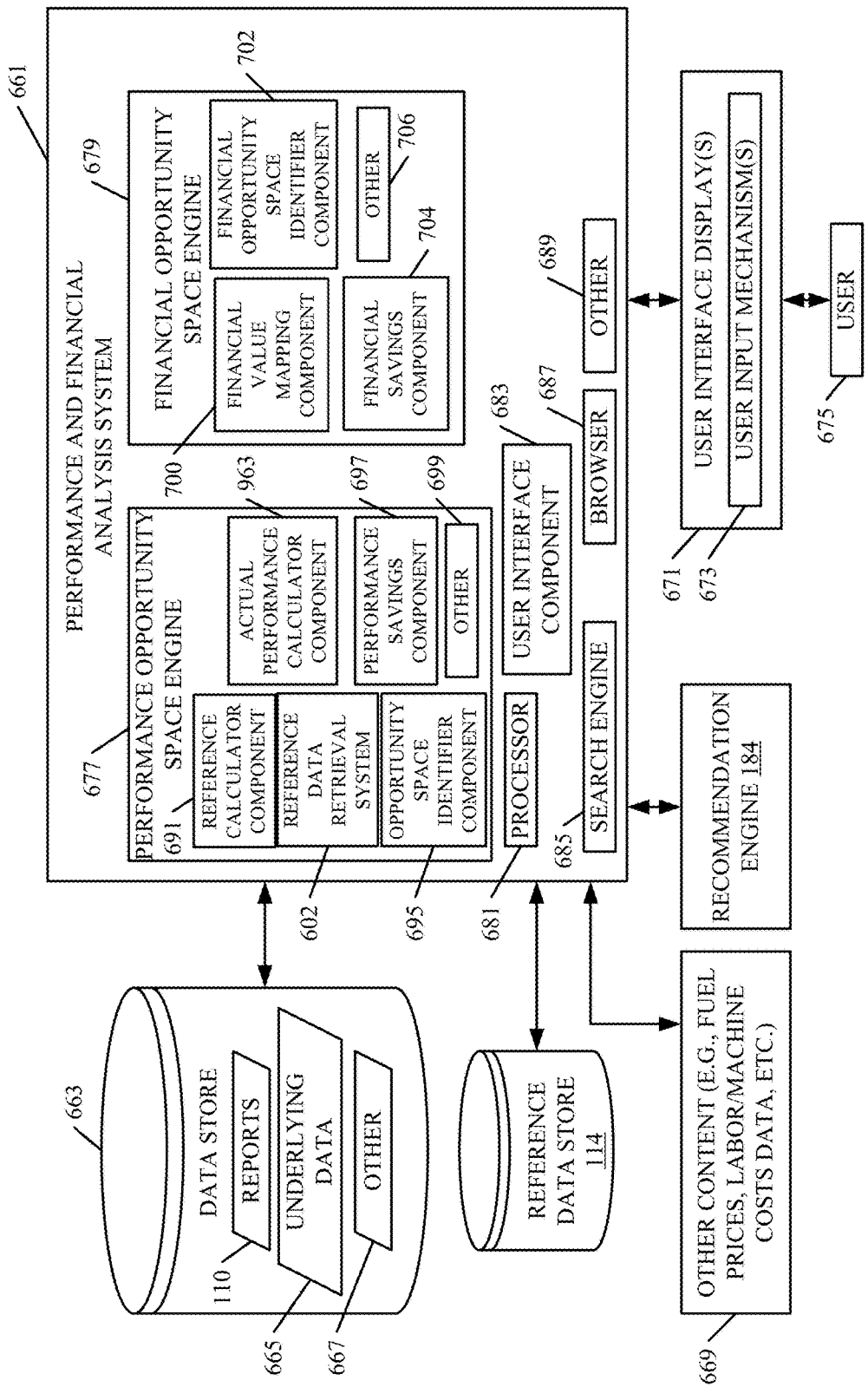
FIG. 7 is a block diagram of one example of a performance and financial analysis system.

FIG. 7 shows that, in one example, the information used by performance report generation architecture 100 can also be provided to a performance and financial analysis system for further analysis. FIG. 7 is a block diagram showing one example of a performance and financial analysis system 661. System 661 can have access to data in data store 663. Data store 663 can, for instance, store operator performance reports 110, any of the underlying data used by architecture 100 (e.g., the data sensed or otherwise gathered by architecture 100, the reference data, or any of a wide variety of other information used in architecture 100). This data is indicated by 665. It can include other data 667 as well. Also, in the example shown in FIG. 7, system 661 can have access to reference data store 114 and recommendation engine 184. Further, it will be noted that system 661 can access other content 669, which can include, as examples, fuel price information indicative of fuel prices, labor and machine cost data, mapping components that can map sensed or calculated data to a given location in a field, and a wide variety of other information. FIG. 7 shows that, in one example, system 661 generates user interface displays 671 with user input mechanisms 673 for interaction by user 675. User 675 can interact with user input mechanisms 673 to control and manipulate system 661. In one example, user 675 is a person who is analyzing the performance data of various operators, machines, or a fleet as a whole, or even a group of fleets. Thus, user 675 may be operator 101, a farm manager, a financial analyst, or a wide variety of other individuals who may be interested in such information. User 675 illustratively uses system 661 to identify a performance opportunity space where improvements in performance are available. User 675 also illustratively uses system 661 to identify a financial opportunity space, corresponding to the performance opportunity space, where financial improvements can be made.

System 661, in one example, includes performance opportunity space engine 677 and financial opportunity space engine 679. It can also include processor 681, user interface component 683, search engine 685, browser 687, and other items 689.

Performance opportunity space engine 677 can include reference calculator component 691 (which can include reference data retrieval system 602 discussed above with respect to FIGS. 6A and 6B), actual performance calculator component 693, opportunity space identifier component 695, performance savings component 697 and it can include other items 699. Financial opportunity space engine 679 can include financial value mapping component 700, financial opportunity space identifier component 702, financial savings component 704, and it can include other items 706 as well.

Before describing the operation of system 661 in more detail, a brief overview will first be provided. Performance opportunity space engine 677, in one example, uses reference calculator component 691 to identify and retrieve relevant reference data for operator 101 and calculate a variety of different reference performance values across a plurality of different performance categories. For instance, it can calculate a theoretical performance optimum, across the categories, for each machine in analyzed similar context to operator 101. This can be based on the machine configuration, the automation level of the machine, and any or all of the other information used by architecture 100 or still other information (such as information obtained from content 669 using search engine 685 or browser 687). Component 693 can also calculate actual performance data corresponding to the actual performance of the various operators, across the plurality of different categories. Opportunity space identifier component 695 then compares the actual performance data against the reference performance data (e.g., against the operator's own historical data, against other operators, such as leading operators in the similar context, against high performing operators in the same crop, geographic region, conditions, etc. as operator 101 but across multiple fleets) to obtain an opportunity space for improving performance. Performance savings component 697 generates performance savings values that quantify the performance opportunity so that user 675 can better understand it. Financial opportunity space engine 697 uses financial value mapping component 700 to map financial values onto the performance savings values identified by component 697. Based on this mapping, financial opportunity space identifier component 702 identifies the financial opportunity space indicating areas where financial improvements can be obtained, based upon improvements in performance. Financial savings component 704 calculates monetary values that quantify the financial opportunities available. System 661 can also invoke recommendation engine 184 to generate actionable recommendations to user 675 so that user 675 can make performance improvements, and thus financial improvements.

It can thus be seen that the opportunities are calculated using relative data instead of absolute data. Relative data considers the conditions, geography, crop type, etc. while absolute measures would not.

In one example, the same metrics are not used to identify multiple different opportunity spaces. This would have the affect of double counting the opportunity corresponding to the metric, causing the opportunity space to appear artificially high. For instance, if a power utilization opportunity is identified, that opportunity overlaps, at least to some extent, with grain productivity. By way of example, assume that power utilization is at 80 percent meaning that there is a 20 percent power utilization opportunity. If power utilization were increased, this would cause the harvest to be completed more quickly. However, this would also increase grain productivity, because the harvest will be completed more quickly. The system thus does not cumulatively identify both the power utilization and the grain productivity opportunities because this would have the affect of double counting the financial or performance savings achieved by increasing power utilization. The system thus, in one example, avoids this type of double counting.

Figure 7A:
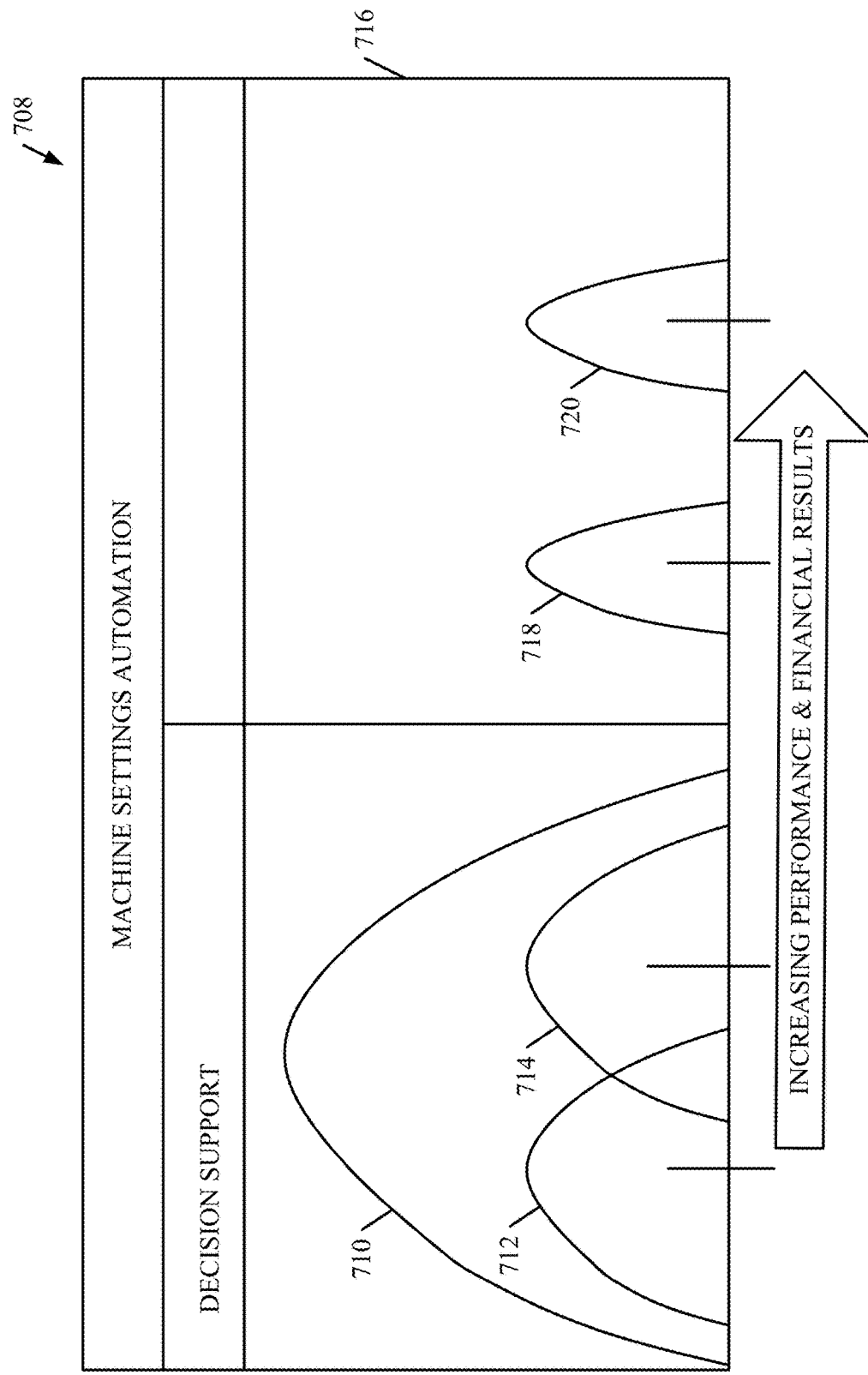
FIG. 7A shows one example of a graphical illustration of a performance and financial opportunity space continuum.

FIG. 7A graphically illustrates a number of the items mentioned above. FIG. 7A includes a chart 708 that plots both actual and theoretical performance distributions along a performance and financial opportunity space continuum indicated by the x-axis of chart 708. Chart 708 graphically illustrates a sustainable performance envelope 710 that characterizes a sustainable performance for the population of operators within the context of their crop and geography and other contextual information. For example, in certain geographies, using certain machines, with certain operators and under certain circumstances (such as weather circumstances, terrain, etc.) it may only be possible to sustain performance within a given range. This is indicated by envelope 710.

Distribution 712 shows the performance distribution of all operators in a given fleet, across selected performance categories, where the performance of those operators lagged behind a leading operator in the specific categories. Distribution 714 shows the distribution of the leading operator (in terms of each performance category) in the fleet. The extreme upper end 716 of the continuum represents a theoretical optimum performance, in the context of the fleet. The theoretical optimum can be calculated using a wide variety of different criteria. In the example show, it is calculated based on assumptions that the different optima are for machines with different automation package configurations. It will be noted that this is just one example of how the theoretical optima can be determined. Others ways for determining optima can be used as well.

For example, the theoretical optimum performance represented by upper end 716 can be calculated based on the assumption that all machines are upgraded to the maximum technology packages, that they are run at power limit, and that the harvested crop quality remains on target. In the example shown in FIG. 7A, chart 708 also shows two other theoretical performance optima 718 and 720. Theoretical optimum 718 is calculated assuming that the machines have a first level of automation, and optimum 720 is calculated assuming the machines have a second, higher level of automation. The items shown in FIG. 7A are only examples, and other performance information can be used as well. For instance, a distribution can be identified to represent the performance of highest performing operators in the same crop and geography. Other examples can be used as well.

Figure 8:
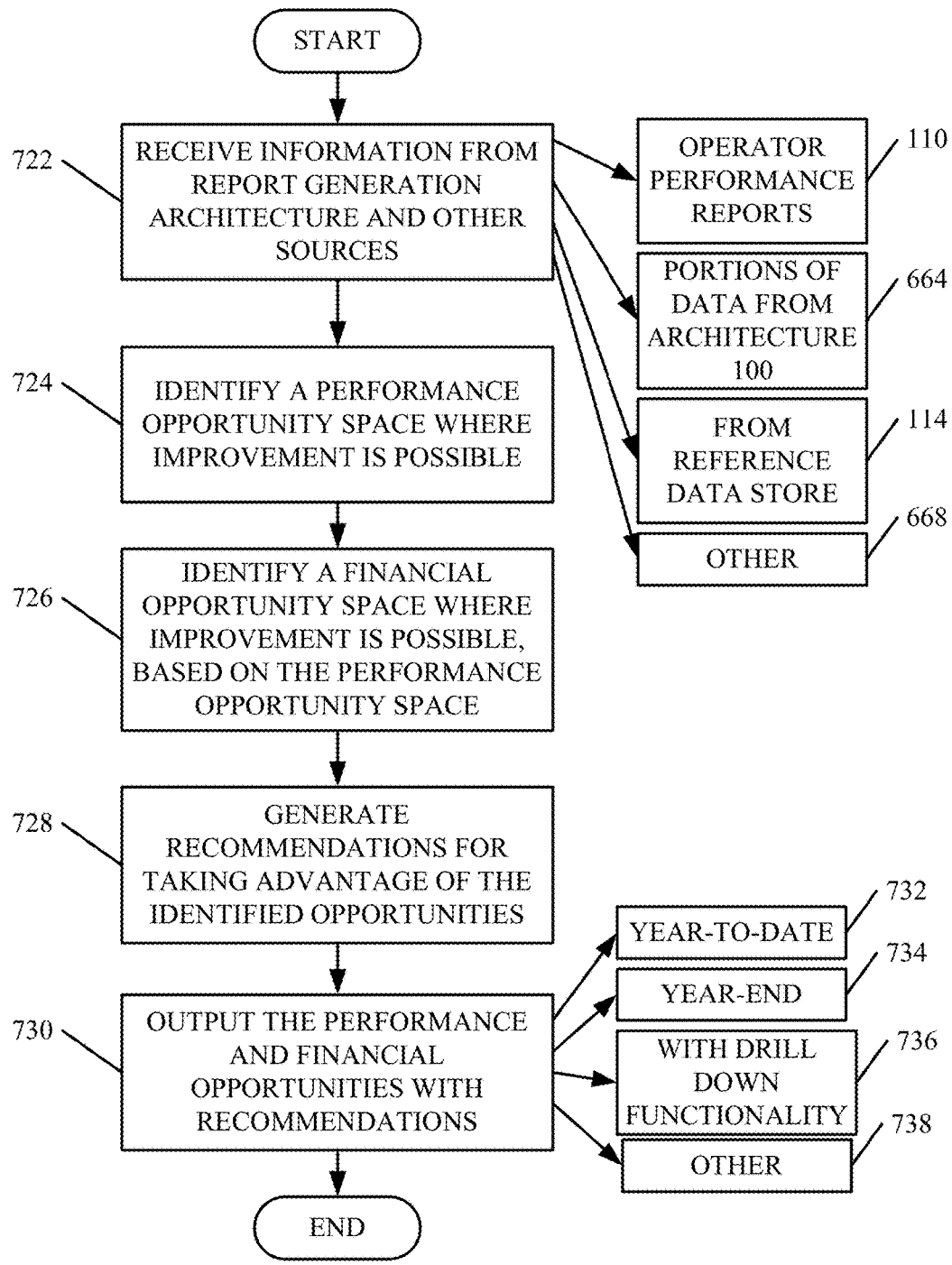
FIG. 8 is a flow diagram illustrating one example of the operation of the system shown in FIG. 7.

FIG. 8 is a flow diagram illustrating one example of the operation of system 661 in more detail. FIG. 8 will be described with reference to FIGS. 7 and 7A. System 661 first receives information from the report generation architecture 100 and it can receive information from other sources as well. This is indicated by block 722 in FIG. 8. As briefly mentioned above, this can include operator performance reports 110, portions of other data from architecture 100 (and indicated by 665), the data from reference data store 114, and other content 667.

Performance opportunity space engine 677 then identifies a performance opportunity space where improvement in performance is possible. This is indicated by block 724 in FIG. 8 and it is described in greater detail below with respect to FIGS. 9 and 10. Briefly, however, performance opportunity space engine 677 can identify that a performance improvement is available if all the lagging operators represented by the lagging distribution 712 (shown in FIG. 7A) were able to improve their performance to match the leading operators indicated by distribution 714. This is just one opportunity space where improvement is available. Similarly, the sustainable performance envelope 710 can be moved upwardly to match distribution 718 if the machine has an upgraded technology package. This is yet another performance opportunity where improvement is possible.

The same is true if the technology is upgraded to match that indicated by distribution 720. In addition, performance can theoretically be improved to the theoretical optimum performance 716. Another opportunity may be identified by comparing the leading performer in a fleet against other highest performers in the same crop and geographic region, across different fleets. In any case, performance opportunity space engine 677 identifies areas where performance improvement is possible.

Financial opportunity space engine 679 then identifies a financial opportunity space where improvement is possible, based on the performance opportunity space. This is indicated by block 726 in FIG. 8. This is described in greater detail below with respect FIGS. 9 and 11. Briefly, however, engine 679 assigns financial values to the improvements in performance that are identified in the performance opportunity space. It thus provides a financial savings output that identifies potential financial savings that can be obtained by improving performance.

System 661 can also illustratively invoke recommendation engine 184 to generate recommendations for taking advantage of the identified performance and financial opportunities. This is indicated by block 728 in FIG. 8.

System 661 then outputs the performance and financial opportunities along with the recommendations. This is indicated by block 730. This can also take a wide variety of different forms. For instance, these items can be output during an agricultural season and reflect the year-to-date opportunities and potential savings. This is indicated by block 732. It can be done at the end of an agricultural season and indicate year end values 734. It can be provided with drill down functionality 736 so the user 675 can review more detailed information corresponding to, for example, individual operators, individual machines, certain times of the year, etc. It can also be provided in other ways 738.

Figure 9:
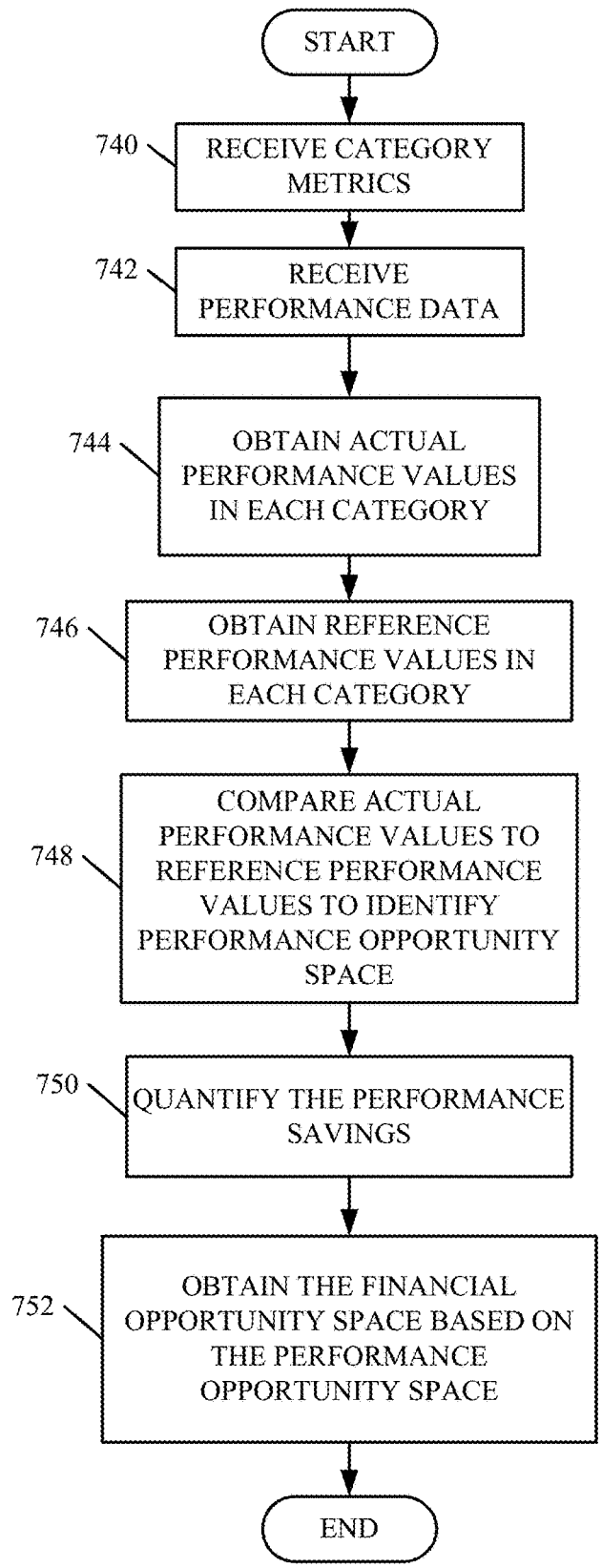
FIG. 9 is a flow diagram illustrating one example of the operation of the performance and financial analysis system in FIG. 7, in more detail.

FIG. 9 is a flow diagram illustrating one example of the operation of system 661 in identifying performance and financial opportunity spaces, in more detail. In the example shown in FIG. 9, performance opportunity space engine 677 first receives a set of category metrics identifying categories for which performance and financial opportunity spaces are to be identified. This is indicated by block 740 in FIG. 9. These category metrics can be received in a variety of different ways. For instance, they can be predefined category identifiers that identify a set of predefined categories. They can also be user configurable categories so that the user can define his or her own categories. Of course, they can be provided in other ways as well. Once the categories are identified, system 661 provides values indicative of the performance and financial opportunity space according to those categories. By way of example, a first set of categories for defining performance and financial opportunities may be in terms of removing grain from the field more quickly. Another set of categories may be to increase the quality of the job. Another set of categories may be to minimize unproductive fuel consumption and another set of categories may be to minimize unproductive time usage. Each of these categories may be defined by metrics, and one example of this is described in greater detail below with respect to FIG. 10A.

Returning again to FIG. 9, once the categories are identified, performance opportunity space engine 677 receives the performance data for the fleet under analysis. This is indicated by block 742. Actual performance calculator component 693 then obtains actual performance values that quantify actual performance in each of the categories. It can do this by simply accessing them, if those values have already been calculated, or it can calculate them if they are derived values that are yet to be derived from the data received by component 693. Obtaining the actual performance values in each category is indicated by block 744 in FIG. 9. They identify how the various operators and machines in the set of operators under analysis actually performed in terms of the specified categories.

Reference calculator component 691 then obtains reference performance values in each category. Again, it can simply access those metrics where they have already been calculated, or it can calculate them if they are yet to be derived. It can identify what data is relevant to the current operator 101 using reference data retrieval system 602. Obtaining the reference performance metrics in each category is indicated by block 746. This information represents various references against which the actual performance data can be compared to identify opportunity spaces. In the example discussed above with respect to FIG. 7A, the reference performance values can correspond to the performance values represented by the leading operator distribution 714, or the theoretical optima represented by distributions 718 and 720 or upper end 716. The reference values can correspond to leading performers across multiple fleets, in the same context (e.g., crop and geographic region, etc.) or other reference values.

Opportunity space identifier component 695 then compares the actual performance values to the reference performance values to identify the performance opportunity space. This is indicated by block 748. For example, component 695 can compare the lagging performance data for the lagging operators in each category (represented by distribution 712 in FIG. 7A) against the leading performance data for the leading operators in each category (and represented by distribution 714). The difference between those two can quantify a performance opportunity where performance can be improved if the lagging operators increase their performance to correspond to that of the leading operators. Also, this can be done for only a single operator, who is not part of a fleet, as well. If the data for operator 101, for instance, is compared to that for leading operators in a similar context, an opportunity space for the single operator 101 can be identified. This is but one opportunity space. Component 695 can also compare the actual performance data for the operator or fleet under analysis to the theoretical optima represented by distributions 718 and 720 and upper end 716 as well. Component 695 can compare fleet-specific (or operator-specific) data to data from other fleets or across a plurality of different fleets in the same crop or crops and in the same geographic region (or otherwise in a similar context). Component 695 can compare the actual performance data to other references, in order to identify other performance opportunity spaces as well.

Once the performance opportunity spaces are identified, performance savings component 697 can calculate or access information to identify the savings (in terms of performance) that can be obtained by taking advantage of each of the identified opportunities. For instance, it can identify the number of gallons or liters of fuel that can be saved, the time in hours that can be saved, wear on the machine that can be saved, labor costs that can be saved, or other units of savings that can be obtained by taking advantage of the performance opportunities identified. Quantifying the performance savings is indicated by block 750 in FIG. 9. The quantifications can be made in English imperial units, metric units or other units.

Financial opportunity space engine 679 then uses financial value mapping component 700 to assign financial values to the various performance savings values generated at block 750. Component 702 identifies the financial opportunity space based upon the assigned values and financial savings component 704 calculates savings (in any desired currency) that can be obtained by taking advantage of the financial opportunities (which, themselves, can be obtained by taking advantage of the performance opportunities). Determining the financial opportunity space based on the performance opportunity space is indicated by block 752 in FIG. 9.

Figure 10:
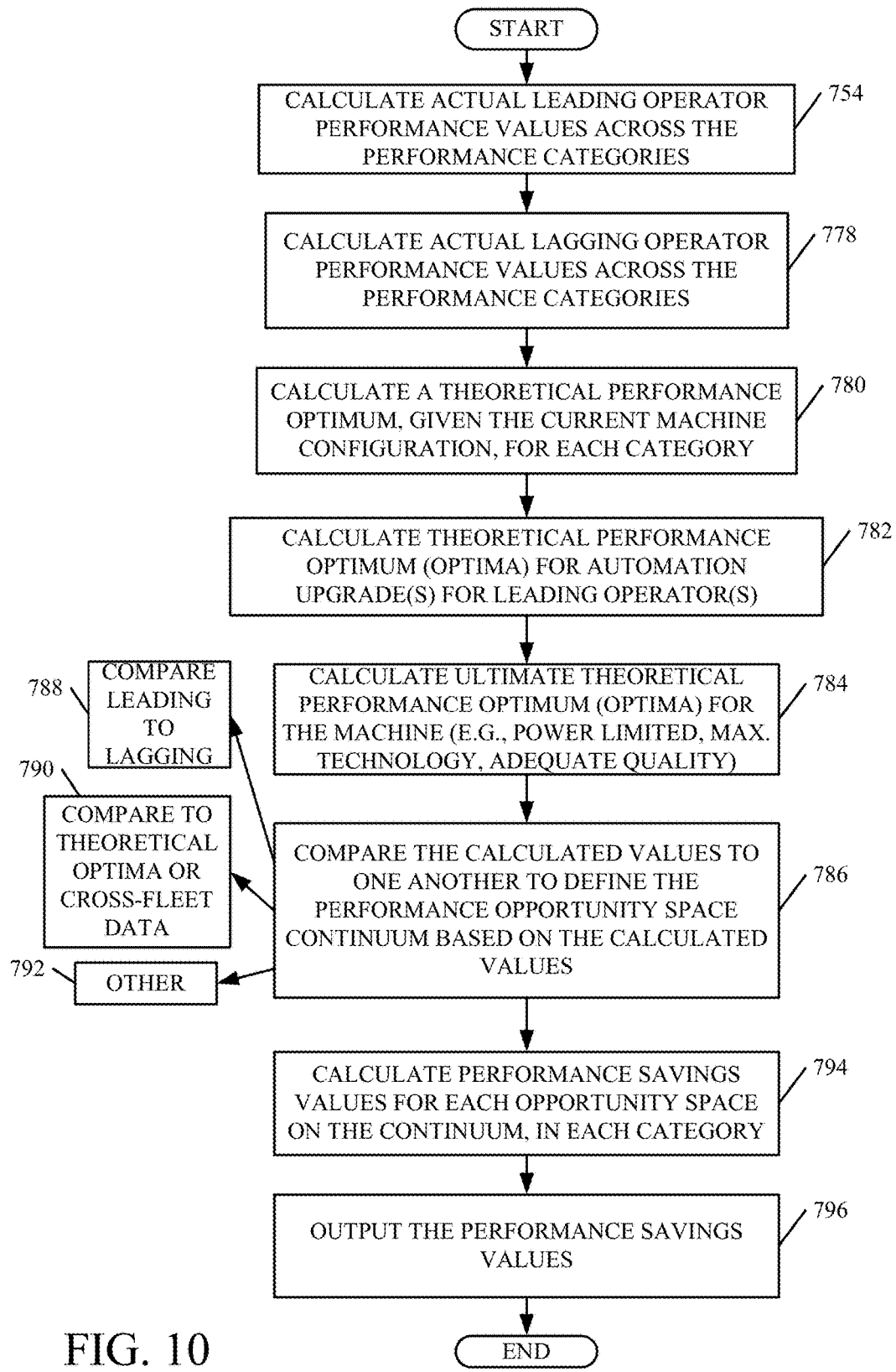
FIG. 10 is a flow diagram illustrating one example of the operation of the system shown in FIG. 7 in identifying a performance opportunity space.
Figure 10A:
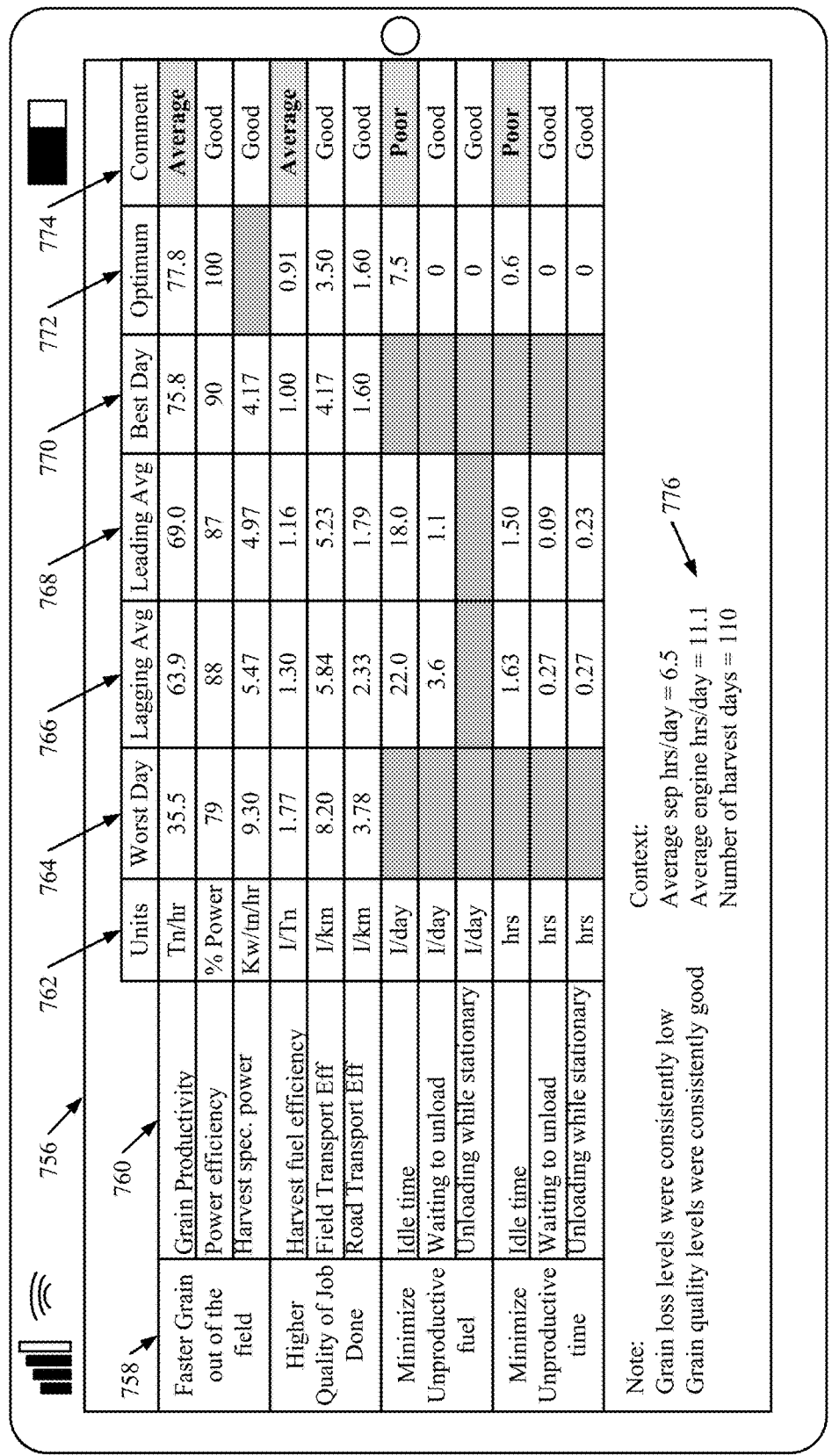
FIG. 10A is one example of a user interface display.

FIG. 10 is a flow diagram illustrating one example of the operation of performance opportunity space engine 677 in more detail. FIG. 10A shows one example of a user interface display that illustrates performance opportunity data in tabular form. It will be appreciated that FIG. 10A shows only one example of a user interface display and a variety of others could be used as well. The information could be shown in chart form, or other diagram form, or in a wide variety of other ways. Also, the information shown can be a wide variety of different information, and that illustrated is illustrated by way of example only. Different opportunities can be shown and they can be shown using different information. FIGS. 10 and 10A will now be described in conjunction with one another.

In the example described with respect to FIGS. 10 and 10A, the performance opportunities to be identified are the opportunities reflected as the difference between the leading performing operators in each category and the lagging performing operators (or operator 101, where only a single operator, who is not part of a fleet, is using the system). For example, there is a performance opportunity if the lagging operators (or operator 101) could be trained or otherwise educated to increase their performance to match the leading operators in each category. Another performance opportunity is identified as the difference between the actual performance data and the theoretical optima with various technology upgrades to the machine, and with respect to the ultimate theoretical optimum. Still other performance opportunities can be identified by comparing other fleet-specific (or operator-specific) data to corresponding data across fleets (such as comparing the top performing operator in this fleet to the highest performers across other fleets). These are only examples of opportunities that can be calculated, and others can be calculated as well.

Actual performance calculator component 693 calculates the actual performance values that will be used to identify opportunities. For instance, where leading operator performance will be used, component 693 calculates leading operator performance values across the performance categories identified. This is indicated by block 754 in FIG. 10A. One example of this is shown in table 756 in FIG. 10A. It can be seen in table 756 that the categories arranged in sets are identified in column 758. Each of those sets includes a plurality of different, individual categories identified in column 760. Each of the categories in column 760 can be represented by performance values in specific units as indicated by column 762. The actual performance values are shown in the remainder of table 756. As an example, column 764 shows the performance values for the worst day of the season, across some of the categories. Column 766 shows the average values for all of the lagging operators (or it can show this for a single operator), across the categories. Column 768 shows the average value of the leading operator, across the categories. Column 770 shows the values for the best day. Column 772 shows the optimum values within the context of the fleet being analyzed, and column 774 shows comments. Information ribbon 776 can include other information as well, such as notes and context information.

It will also be noted that the information contained in chart 756 is only one example of the information that can be calculated. Different, additional, or less information can be calculated as well. For instance, cross-fleet data can be calculated or retrieved. Also, in this example the grain loss quality metrics were not included, but these metrics can be included as well within the framework of the approach. As an example, if the grain quality data shows that there is a relatively high level of grain damage, this may result in an elevator not accepting the grain, without penalty. In addition, if the grain loss data shows losses in excess of typical when compared to reference data, this can have a financial affect as well. Thus, grain quality and grain loss data can be included. The same is true of residue data.

In any case, block 754 indicates that actual performance calculator 693 calculates the actual performance values, across the different categories, for the leading operators in each category as shown in column 768, or other groups or individuals that will be used as a basis for comparison to identify opportunities. Actual performance calculator component 693 can also calculate the actual performance values, across the various performance categories, for still other fleet-specific groups or individuals that are to be used in identifying opportunities. In one example, actual performance data is also calculated for lagging operators. This is indicated by block 778 and is shown generally in column 776 of chart 756.

Reference calculator component 691 then calculates a variety of different reference values against which the actual performance values can be compared to identify the performance opportunity space. One reference value is a theoretical performance optimum, given the current machine configuration. This is indicated by block 780. One example of this is illustrated in column 772 in FIG. 10A. Component 691 can also calculate the theoretical performance optima corresponding to the machines in the fleet (or operator) under analysis, assuming they had automation upgrades. This is indicated by block 782. This can also be used as a reference value. Component 691 can also calculate the ultimate theoretical performance optimum for the machines, assuming that they are power limited, have maximum technology upgrades, and are producing adequate quality product. This is indicated by block 784. Of course, other reference data can be calculated or obtained as well, such as data for leading operators across other fleets, in the same context (e.g., crop or crops and in a similar geographic region) or other data.

Opportunity space identifier component 695 then compares the actual performance data against the calculated reference values to identify a performance opportunity space continuum. This is indicated by block 786. For instance, component 695 can compare the leading operator in each category to the average of the lagging operators to identify an opportunity space. This is indicated by block 788. It can compare the average of all operators (or the leading or lagging operators) to any of the theoretical optima that were calculated or the cross-fleet data. This is indicated by block 790. It can identify the opportunity space continuum in other ways as well and this is indicated by block 792.

Performance savings component 697 then calculates performance savings values that quantify the performance savings that can be obtained for each opportunity space on the continuum, in each category. This is indicated by block 794. It then outputs the performance savings values as indicated by block 796.

Figure 10B:
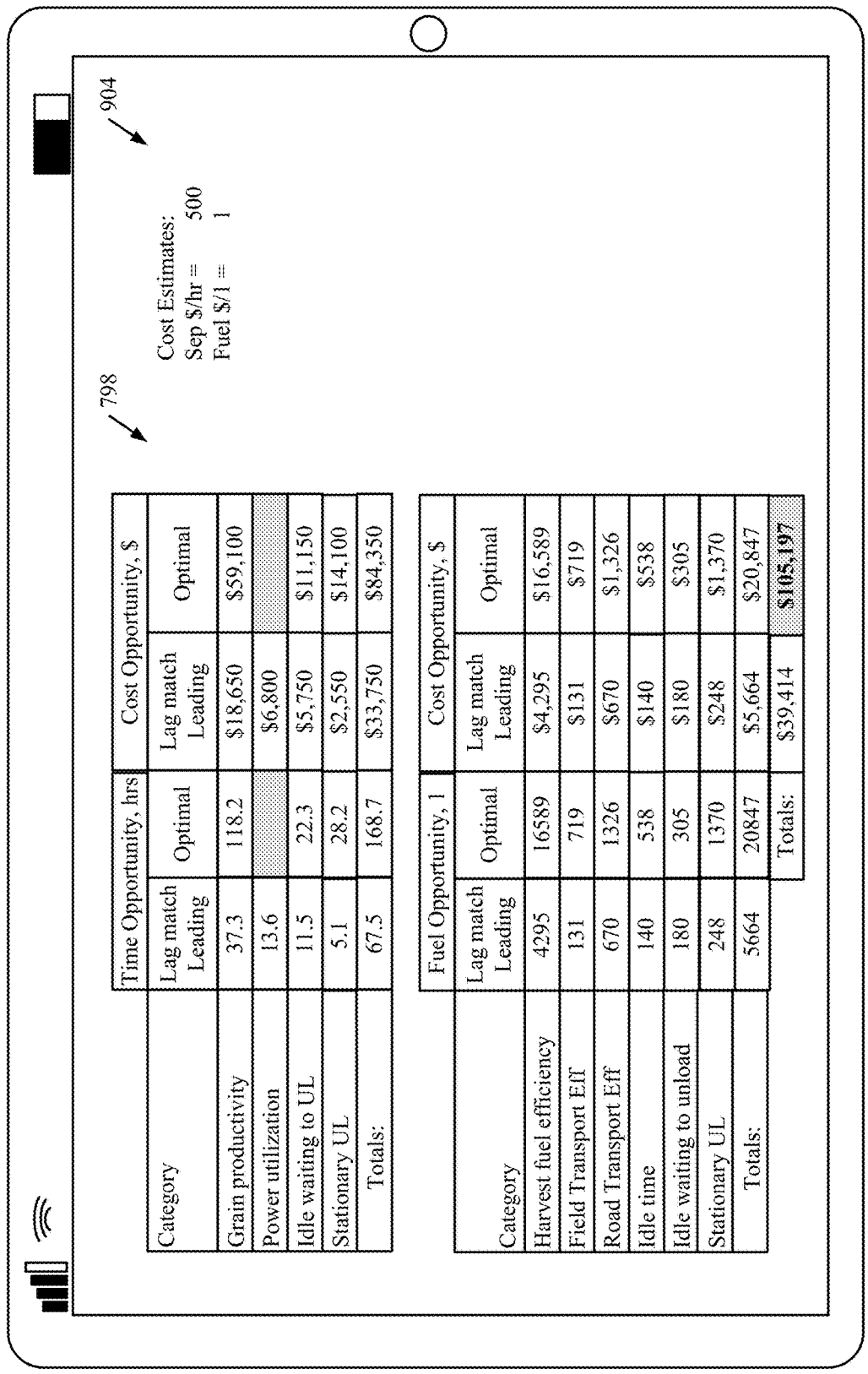
FIG. 10B is one example of a user interface display.

FIG. 10B shows one example of a user interface display 798 that illustrates this. It will be appreciated that while FIG.

10B shows results for a fleet of users under analysis, the same information can be surfaced when analyzing a single user, who is not part of a fleet. In that case, the relevant reference data for comparison can be retrieved by system 602.

It can be seen in FIG. 10B that the performance opportunity across some categories is quantified in hours saved and the performance opportunity in other categories is quantified in liters of fuel saved. For instance, by comparing the leading performers to the lagging performers in the grain productivity category, it can be seen that the fleet could have saved 37.3 hours if the performance of the lagging operators matched the performance of the leading operators. If the entire fleet of operators matched one of the optimal reference values that was calculated, the savings would have been 118.2 hours. Again, it will be noted that these values are, in one example, relative instead of absolute. This adjusts for factors outside of the control of the manager or operator (such as average field size, crop yields in the region, etc.).

Similarly, if the lagging operators had matched the leading operators in terms of power utilization, the fleet could have saved 13.6 hours. If the lagging operators matched the leading operators in terms of idle time waiting to unload, the fleet could have saved 11.5 hours, and if all operators performed at the optimum level, the fleet could have saved 22.3 hours. In addition, if the lagging operators matched the leading operators in terms of stationary unloading time, the fleet would have saved 5.1 hours. If all operators performed optimally in that category, the fleet would have saved 28.2 hours.

The same types of opportunities are identified with respect to fuel use. For instance, if the lagging operators had matched the leading operators in terms of harvest fuel efficiency, the fleet would have saved 4,295 liters of fuel. If all operators had performed at the optimum level, the fleet would have saved 16,589 liters of fuel. These numbers are calculated, in the example shown in FIG. 10B, for the categories of fuel transport efficiency, road transport efficiency, idle time, idle waiting to unload, and stationary unloading as well. It can thus be seen that performance opportunity space engine 677 has now identified various performance opportunities that can be taken advantage of, across a plurality of different performance categories. It has also quantified the savings (in understandable units, such as liters of fuel and time in hours) that can be obtained by taking advantage of each opportunity.

As mentioned above, a wide variety of other opportunities can be identified as well, such as deviation from a quality target for sensed grain damage (sensed on the machine or as measured by the elevator) and actual grain loss sensed by the machine and measured against the operator's grain loss preference target (if set by the operator or manger). These are examples only.

Figure 11:
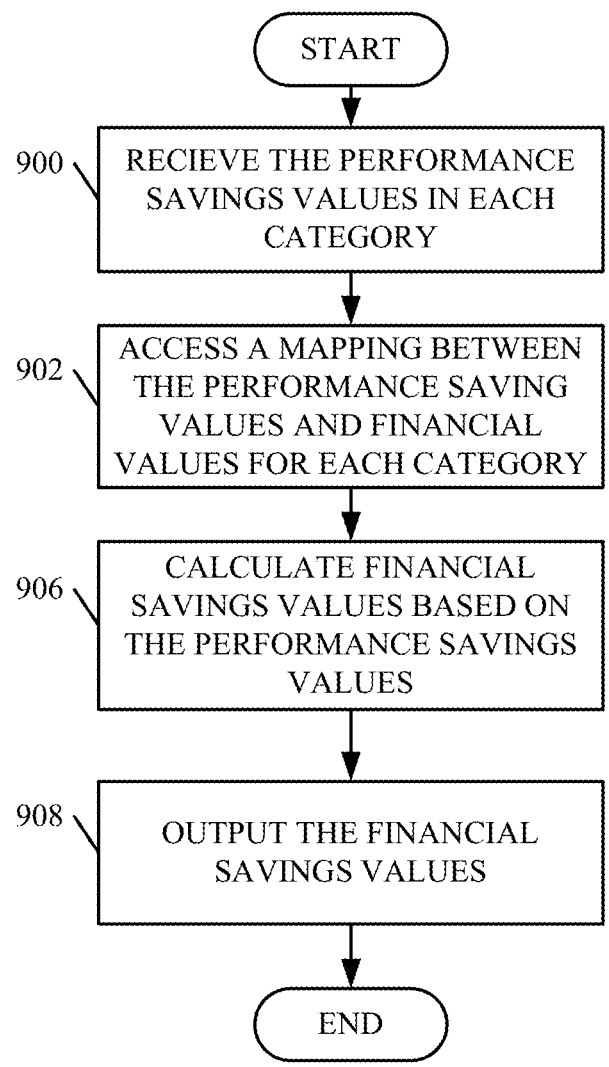
FIG. 11 is a flow diagram illustrating one example of the operation of the system shown in FIG. 7 in identifying a financial opportunity space.

Financial opportunity space engine 679 assigns a financial value to each opportunity. FIG. 11 is a flow diagram illustrating one example of the operation of engine 679 in more detail. Engine 679 first receives the performance savings values in each category, that were calculated by performance savings component 679. Receiving this information is indicated by block 900 in FIG. 11. By way of example, engine 679 will receive the hours of saving calculated for each opportunity shown in FIG. 10B. It will also illustratively receive the liters of fuel calculated for each opportunity shown in FIG. 10B.

Financial value mapping component 700 then accesses a mapping between the performance savings values and financial values for each category. This is indicated by block 902.

By way of example, mapping component 700 illustratively identifies a financial value in terms of currency per hour (such as dollars per hour). By way of example, it may be that running a separator costs approximately $500.00 per hour (which can be calculated in any desired way, such as by using machine value depreciation). These values are shown illustratively at 904 in FIG. 10B. Mapping component 700 also illustratively identifies a currency value to assign to each liter of fuel. In the example shown in FIG. 10B, component 700 assigns a value of $1.00 per liter of fuel.

Once the financial values are assigned to each of the performance saving values in each category, then financial opportunity space identifier 702 identifies the financial opportunity space by calculating a financial amount that could be saved by taking advantage of each of the performance opportunities. These amounts correspond to the various financial opportunities.

For example, again referring to FIG. 10B, financial opportunity space identifier component 702 indicates that, if the lagging operators matched the leading operators in the grain productivity category, then the fleet would have saved $18,650.00. This is obtained by multiplying the 37.3 hour performance opportunity by $500.00 per hour. Component 702 calculates these financial opportunities for each category shown in FIG. 10B.

It does the same for the fuel opportunity. Thus, it assigns one dollar per liter of fuel that could be saved, multiplies that by the number of liters that could be saved in each opportunity and identifies this savings value as the corresponding financial opportunity.

Financial savings component 704 then calculates the ultimate savings that could be obtained by increasing performance across the various categories. It can be seen in FIG. 7B that if the lagging operators improved their performance to match the leading operators across all categories, the fleet would save $39,414.00. If all operators were operating at an optimal level, in all categories, the fleet would save $105,197.00. This information is output for viewing or for other use or analysis by user 675. In addition, a recommendation engine can generate recommendations, prioritized on financial or performance impact, for a machine or operator under analysis. Calculating the financial savings values based upon the performance saving values and outputting the financial savings values is indicated by blocks 906 and 908 in FIG. 11.

In one example, the financial and performance opportunities can be used to identify performance enhancing items as well. For instance, a training facility can have a catalog of training classes that map to the performance opportunities identified. Engine 677 can access the mapping to identify training classes that most directly map to the performance opportunities identified. As an example, a certain training class may have a strong mapping to increasing an operator's performance in power utilization. Another may be strongly mapped to another performance pillar, such as grain productivity based on the performance opportunities, engine 677 can identify the corresponding classes and send them to recommendation engine 184 where they can be included in recommendations. The same can be done to recommend technology upgrades. System 661 can extrapolate savings that will be seen with the purchase of upgrades packages and send that to recommendation engine 184 where it can be presented to the user, along with an estimated return on investment. The information can be used for other sales recommendations as well.

The performance and financial analysis features not only greatly improve the performance of an operator, farm manager, or other consumer of the information, but it greatly enhances performance of the agricultural or other mobile machine. The information can be used by an operator to make adjustments to the operation of the mobile machine to improve performance, and other consumers of the information can make better decisions, more accurately, and more quickly regarding operation of the fleet. These features also improve the performance of the computing system in which they are deployed. By surfacing this information more quickly, the user need not burden the system with additional navigational and searching operations. This decreases the computational overhead of the system and thus improves its performance.

Because the system detects, aggregates and surfaces this type of information, and because the system automatically senses this information, and surfaces the information, it improves the operation of the system itself. A user need not conduct multiple queries against the system, and use computing resources and memory overhead to search for this information and then to aggregate it on the system. Instead, the system automatically generates the information and stores it or surfaces it in real time (or near real time). This reduces the number of searches launched against the system to generate the information. This can increase the speed of the system and reduce the processing and memory overhead needed in obtaining this type of information.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
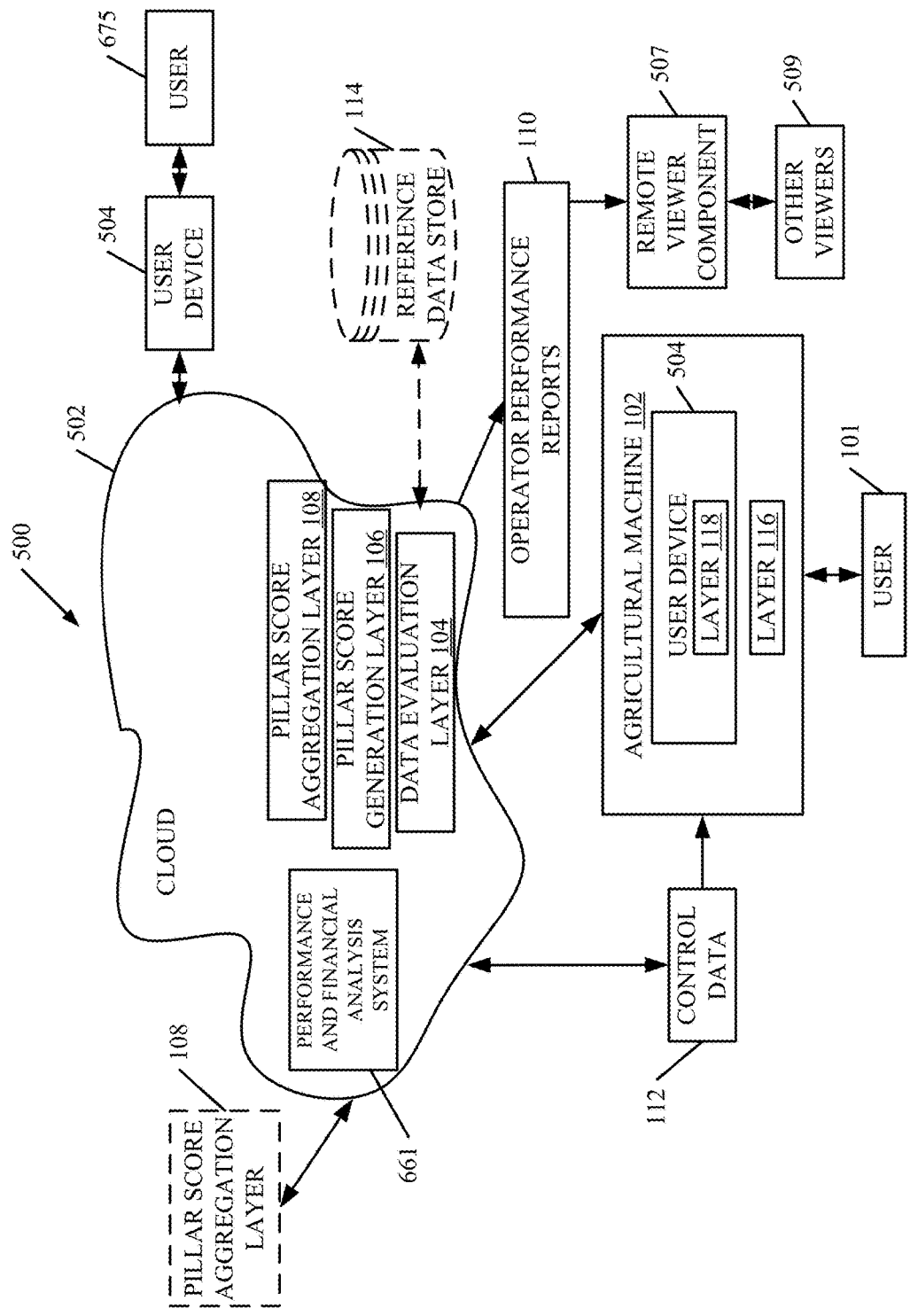
FIG. 12 is a block diagram showing one embodiment of the architecture shown in FIGS. 1, 2, and 7 deployed in a cloud computing architecture.

FIG. 12 is a block diagram of architecture 100, shown in FIG. 1, and those shown in FIGS. 2 and 7, except that elements are disposed in a remote server computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 12, some items are similar to those shown in FIGS. 1, 2 and 7 and they are similarly numbered. FIG. 12 specifically shows that layers 104, 106, 108 and system 661 can be located in cloud 502 (which can be public, private, or a combination where portions are public while others are private). Therefore, users 101 and 675 can operate machine 102 or access those systems or other systems using a user device. User 101 for instance, can use a user device 504 on machine 102. User 675, for example, can use a different user device 504. Machine 102 can access layers 104, 106 and 108 through cloud 502. User 675 can access system 606 through cloud 502.

FIG. 12 also depicts another embodiment of a cloud architecture. FIG. 12 shows that it is also contemplated that some elements of architecture 100, those in FIG. 2 or 7 can be disposed in cloud 502 while others are not. By way of example, data store 114 can be disposed outside of cloud 502, and accessed through cloud 502. In another example, layer 108 (or other layers) or analysis system 661 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

Further, FIG. 12 shows that a remote view component 507 (which can be another user device, or another component) can be used by one or more other viewers 509 who are remote from machine 102. Viewers 509 can include user 675 or other viewers that can view the reports, the opportunity or variation information or team information or other information if properly authenticated.

It will also be noted that architecture 100, or portions of it, or system 661 or the other architectures and systems can be disposed on a wide variety of different devices. Some of those devices include servers, desktop computers, laptop computers, tablet computers, or other mobile devices, such as handheld computers, cell phones, smart phones, multimedia players, personal digital assistants, etc.

Figure 13:
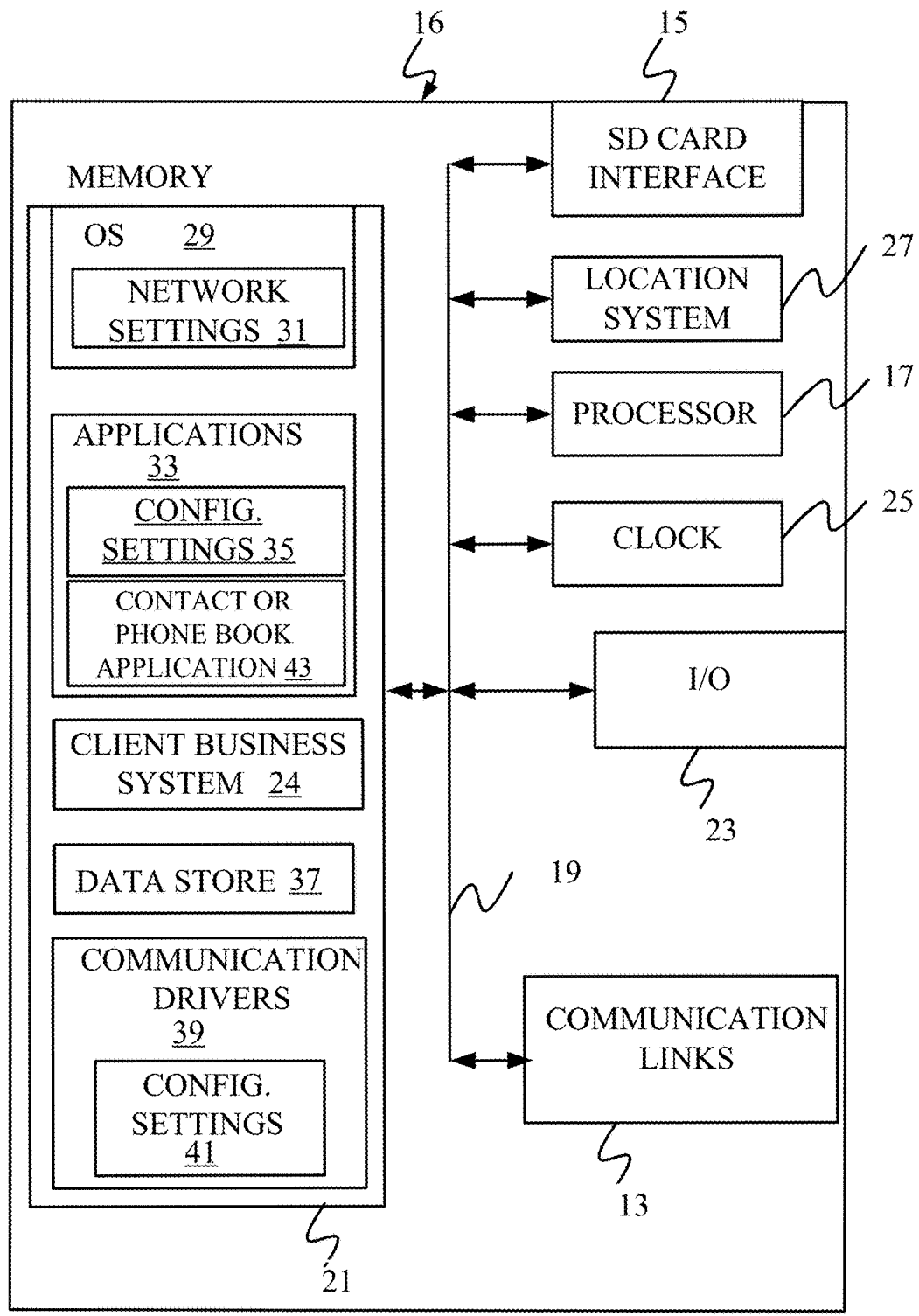

FIG. 13 is a simplified block diagram of one illustrative example of a handheld or mobile computing device that can be used as a user's or client's hand held device 16, in which the present system (or parts of it) can be deployed. FIGS. 14-18 are examples of handheld or mobile devices.

FIG. 13 provides a general block diagram of the components of a client device 16 that can run components of architecture 100 or system 661 or the architectures in FIG. 2 or 7, or that interacts with architecture 100 or system 661 or the other architecture, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including wireless connections to networks.

Under other embodiments, applications or systems are received on a removable Secure Digital (SD) card that is connected to a SD card interface 15. SD card interface 15 and communication links 13 communicate with a processor 17 (which can also embody processors 140, 155, 163, 186, 680 from FIG. 2 or 7) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 14 shows one embodiment in which device 16 is a tablet computer 601. In FIG. 14, computer 661 is shown with the user interface display from FIG. 10A displayed on the display screen 603. Screen 603 can be a touch screen (so touch gestures from a user's finger 605 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 601 can also illustratively receive voice inputs as well.

Figure 15:
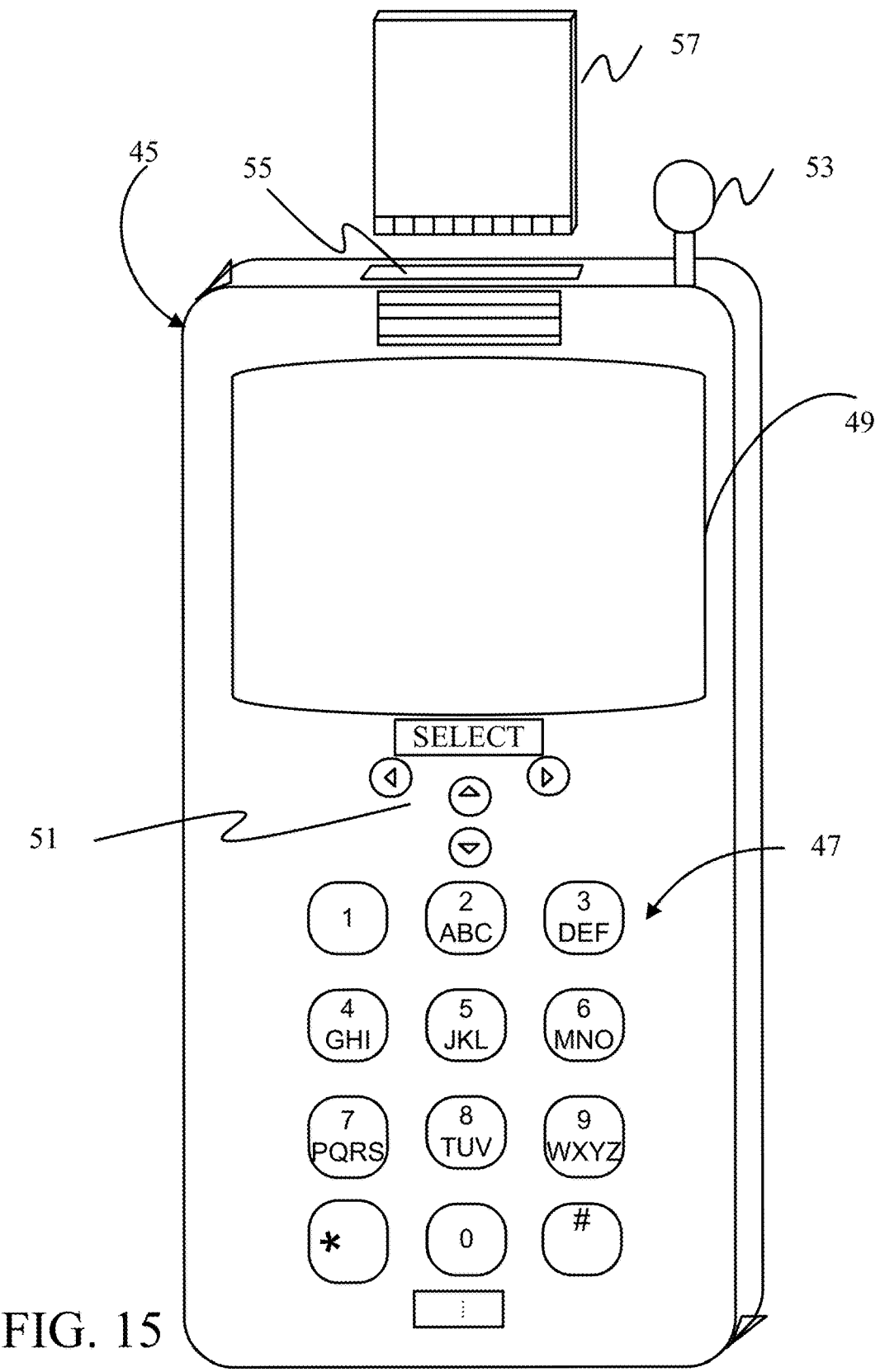
Figure 16:
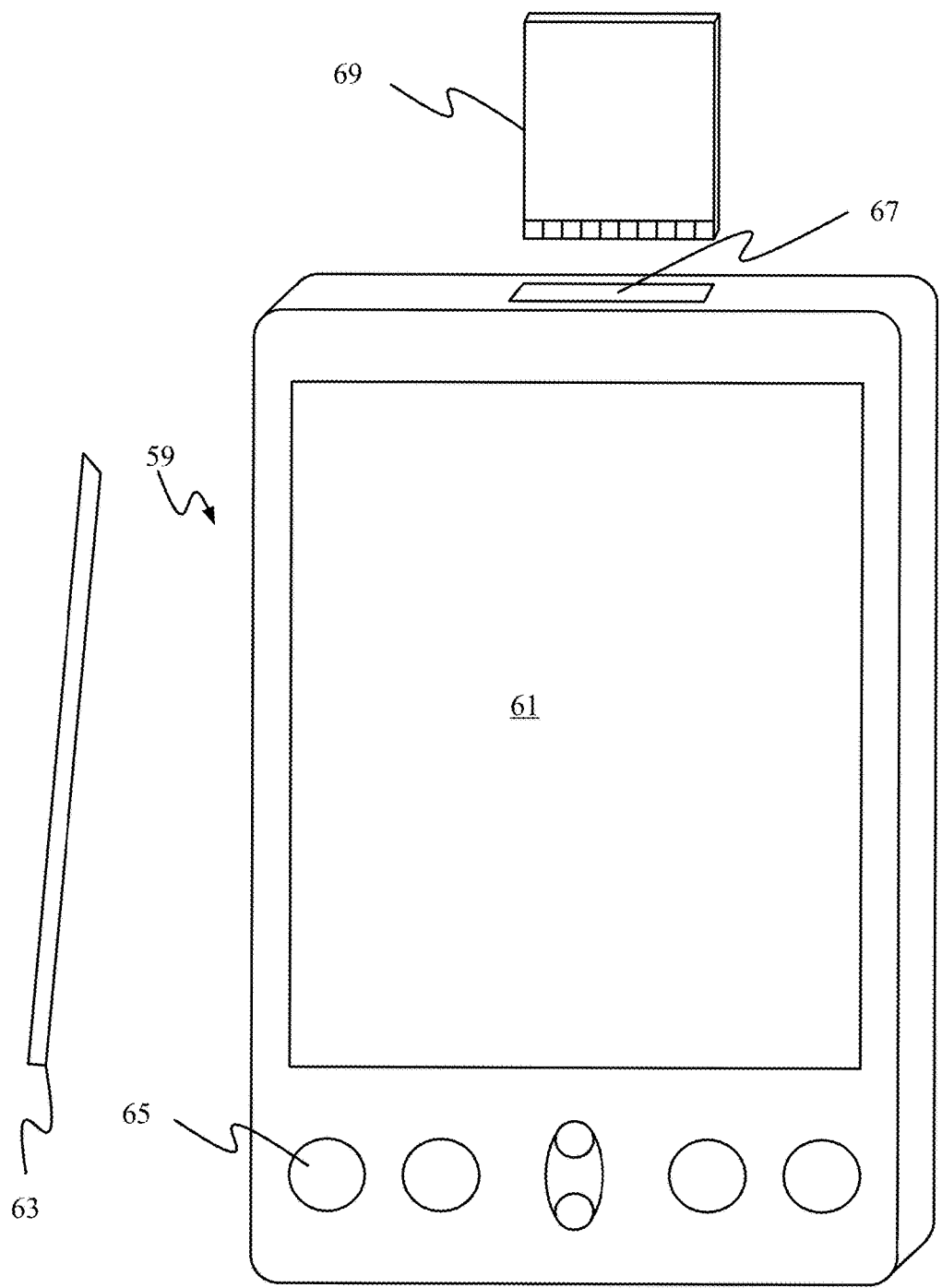

FIGS. 15 and 16 provide additional examples of devices 16 that can be used, although others can be used as well. In FIG. 15, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 16 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 17:
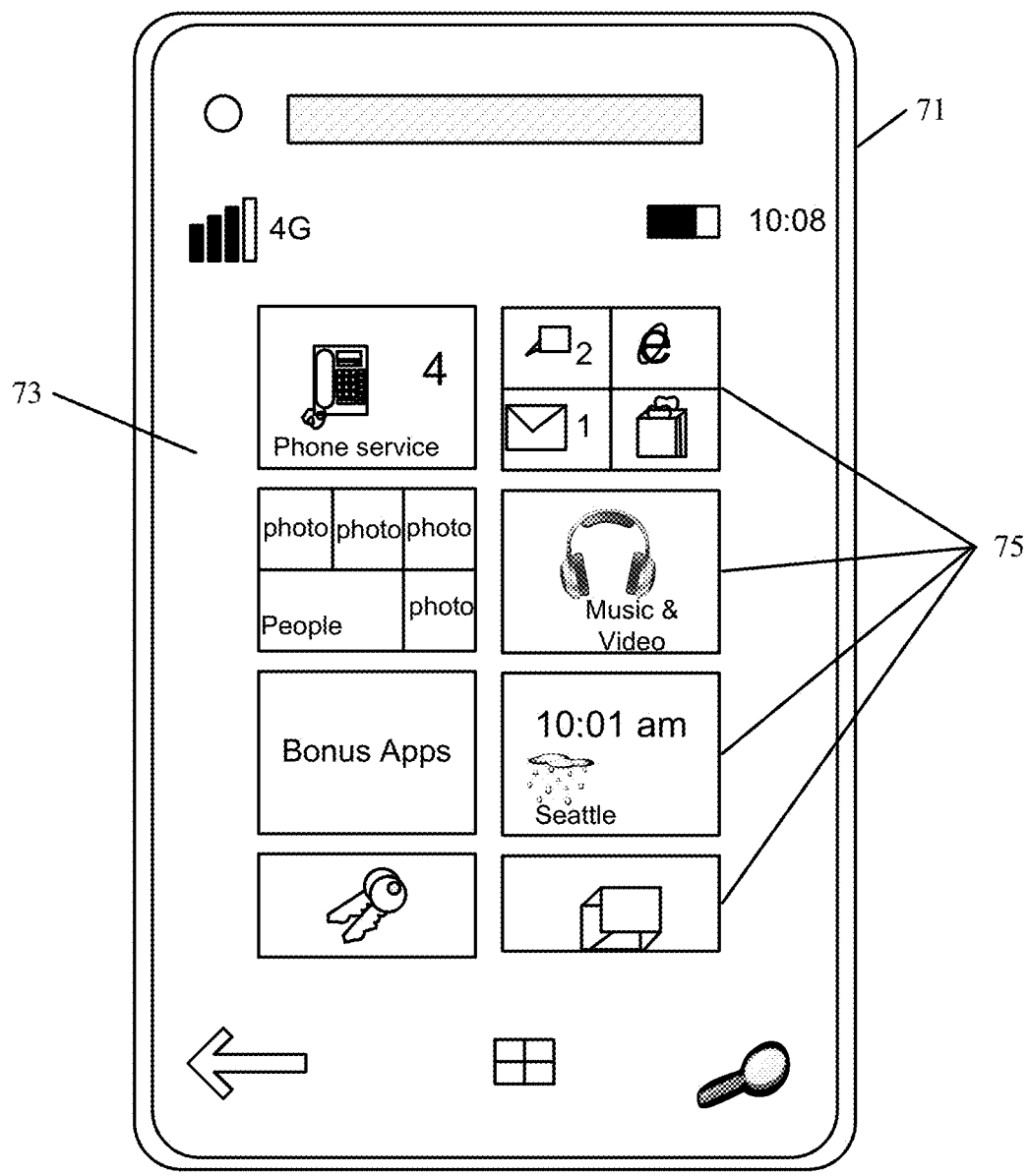
Figure 18:
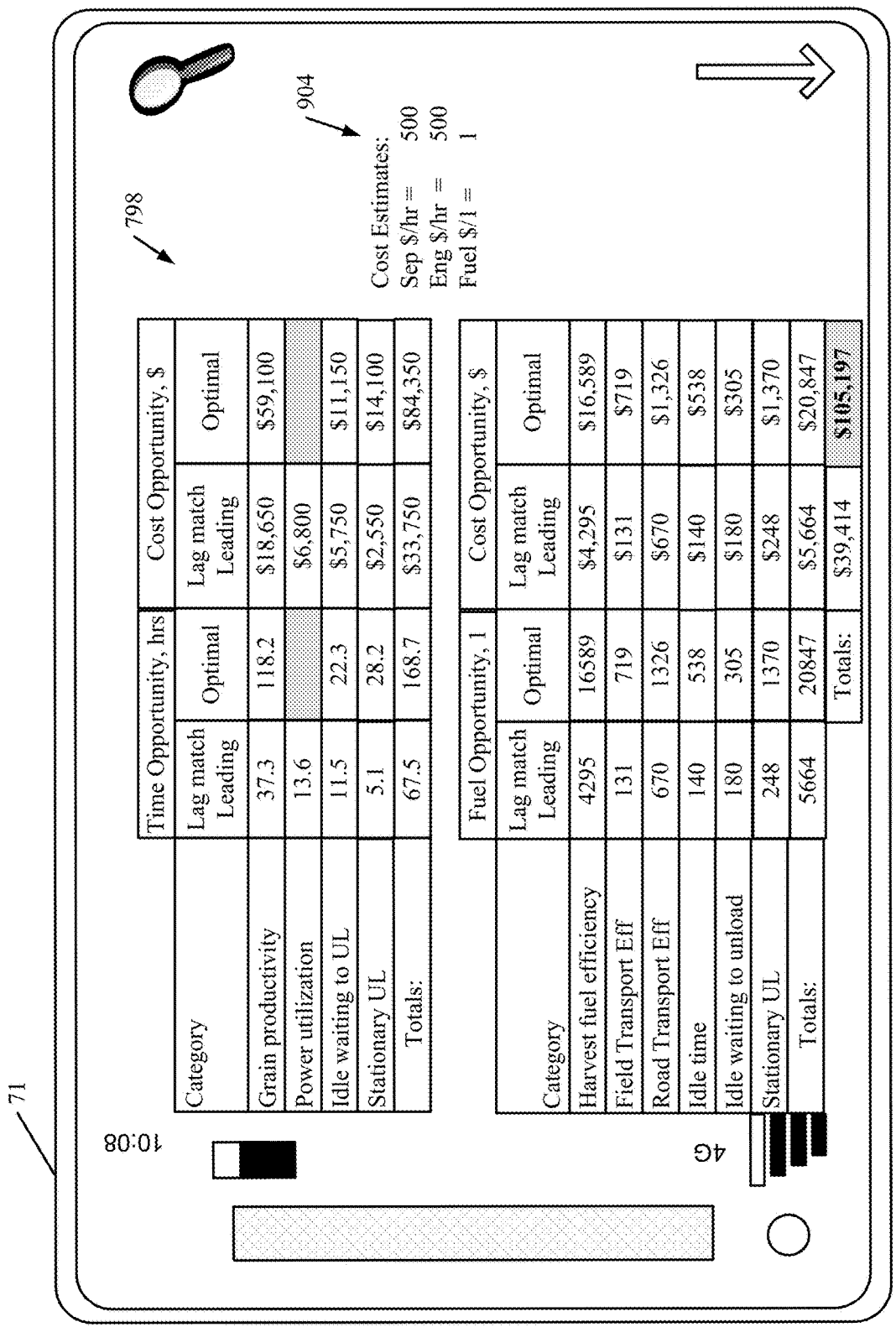

FIG. 17 is similar to FIG. 16 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 18 shows phone 71 with the display of FIG. 10B displayed thereon.

Note that other forms of the devices 16 are possible.

Figure 19:
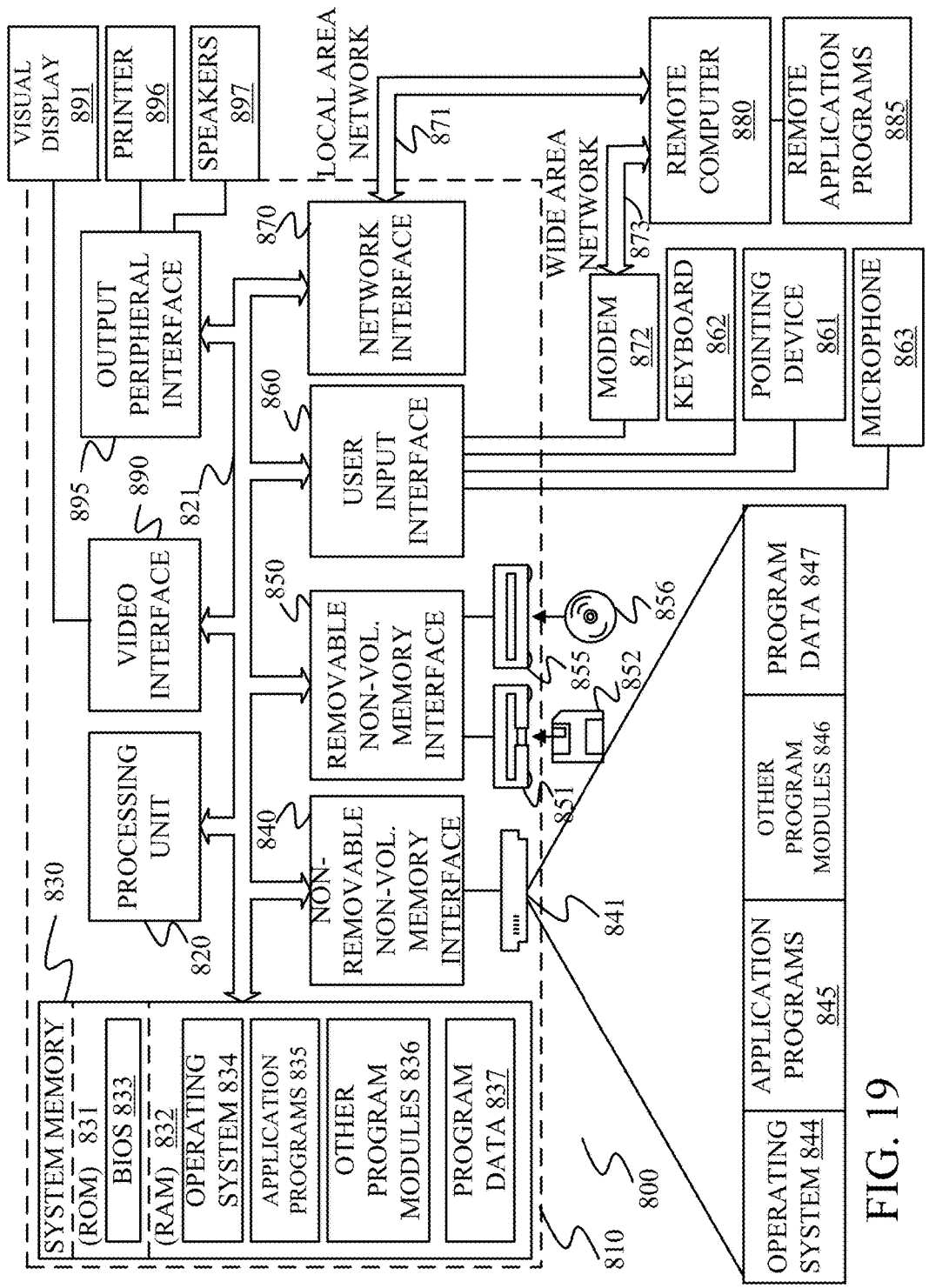
FIG. 19 is a block diagram of one illustrative computing environment which can be used in the architecture shown in FIGS. 1, 2, and 7.

FIG. 19 is one embodiment of a computing environment in which architecture 100, or the other architectures or parts of them, (for example) can be deployed. With reference to FIG. 19, an exemplary system for implementing some embodiments includes a general-purpose computing device in the form of a computer 810. Components of computer 810 may include, but are not limited to, a processing unit 820 (which can comprise processor 140, 155, 163, 186, 681), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1, 2, or 7 can be deployed in corresponding portions of FIG. 19.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 19 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 810. In FIG. 19, for example, hard disk drive 841 is illustrated as storing operating system 844, application programs 845, other program modules 846, and program data 847.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 19 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 19 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is an agricultural data retrieval system, comprising:
- a context filter system that receives machine context information, indicative of a context of an agricultural machine operated by a first operator, and identifies a first set of operator performance data based on the machine context information, the operator performance data being indicative of operator performance of other operators operating other agricultural machines;
- a performance metric filter system that identifies a range of operator performance metric values relative to an operator performance metric value corresponding to the first operator and identifies a second set of operator performance data based on the identified range and based on the first set of operator performance data;
- a data retrieval component that retrieves the second set of operator performance data; and
- an output component that outputs the second set of operator performance data as a reference data set for comparison against operator performance data for the first operator.

Example 2 is the agricultural data retrieval system of any or all previous examples wherein the context filter system comprises:
- a filter criteria identifier component that identifies a set of context filter criteria used in identifying the first set of operator performance data.

Example 3 is the agricultural data retrieval system of any or all previous examples and further comprising:
- a search system that searches a data store for operator performance data that matches the context filter criteria and the score range of operator performance metric values.

Example 4 is the agricultural data retrieval system of any or all previous examples and further comprising:
- a data store that stores a context filter criteria hierarchy that hierarchically arranges the context filter criteria, the filter criteria identifier identifying the context filter criteria based on the context filter criteria hierarchy.

Example 5 is the agricultural data retrieval system of any or all previous examples and further comprising:
- a first data volume analysis component that determines whether a volume of data in the first set of operator performance data meets a statistical significance threshold.

Example 6 is the agricultural data retrieval system of any or all previous examples wherein the filter criteria identifier component is configured to access the filter criteria hierarchy and change the context filter criteria used in identifying the first set of operator performance data, based on the first data volume analysis component determining that the volume of data does not meet the statistical significance threshold, the data retrieval component retrieving a third set of operator performance data based on the changed context filter criteria.

Example 7 is the agricultural data retrieval system of any or all previous examples wherein the performance metric filter system comprises:
- a score range identifier component that identifies the range; and
- a second data volume analysis component that determines whether a volume of data in the second set of operator performance data meets a statistical significance threshold.

Example 8 is the agricultural data retrieval system of any or all previous examples wherein the score range identifier component is configured to change the range used in identifying the second set of operator performance data, based on the second data volume analysis component determining that the volume of data does not meet the statistical significance threshold, the search component identifying a third set of operator performance data based on the changed range.

Example 9 is the agricultural data retrieval system of any or all previous examples wherein the data retrieval component retrieves the operator performance data in units comparable to units of the operator performance data for the first operator.

Example 10 is the agricultural data retrieval system of any or all previous examples and further comprising:
- a set of context sensors that sense the machine context information.

Example 11 is the agricultural data retrieval system of any or all previous examples wherein the set of machine context sensors comprise at least one of a geographic location sensor, a machine type sensor, a machine configuration source or a crop sensor.

Example 12 is the agricultural data retrieval system of any or all previous examples wherein the performance metric filter system is configured to identify the second set of operator performance data as a subset of the first set of operator performance data.

Example 13 is a computer implemented method, comprising:
- detecting machine context information, indicative of a context of an agricultural machine operated by a first operator;
- identifying a first set of operator performance data based on the machine context information, the operator performance data being indicative of operator performance of other operators operating other agricultural machines;
- selecting a range of operator performance metric values relative to an operator performance metric value corresponding to the first operator;
- identifying a second set of operator performance data, as a subset of the first set of operator performance data, based on the identified range and based on the first set of operator performance data;
- retrieving the second set of operator performance data; and
- outputting the second set of operator performance data as a reference data set for comparison against operator performance data for the first operator.

Example 14 is the computer implemented method of any or all previous examples and further comprising:
- prior to retrieving the second set of operator performance data, identifying context filter criteria; and
- searching a data store for operator performance data that matches the context filter criteria and the range of operator performance metric values.

Example 15 is the computer implemented method of any or all previous examples wherein identifying context filter criteria comprises:
- identifying the context filter criteria based on a context filter criteria hierarchy that hierarchically arranges the context filter criteria.

Example 16 is the computer implemented method of any or all previous examples and further comprising:
  determining whether a volume of data in the first set of operator performance data meets a statistical significance threshold;
  if not, accessing the filter criteria hierarchy and changing the context filter criteria used in identifying the first set of operator performance data; and
  retrieving a third set of operator performance data based on the changed context filter criteria.

Example 17 is the computer implemented method of any or all previous examples and further comprising:
  determining whether a volume of data in the second set of operator performance data meets a statistical significance threshold; and
  if not, changing the range used in identifying the second set of operator performance data; and
  identifying a fourth set of operator performance data based on the changed range.

Example 18 is the computer implemented method of any or all previous examples wherein detecting machine context information comprises:
  sensing the machine context information as at least one of a geographic location, a machine type, a machine configuration or a crop characteristic.

Example 19 is an agricultural data retrieval system, comprising:
  a context filter system that receives machine context information, indicative of a context of an agricultural machine operated by a first operator;
  a filter criteria identifier component that identifies a set of context filter criteria;
  a search system that searches a data store to identify a first set of operator performance data that matches the context filter criteria;
  a performance metric filter system that identifies a range of operator performance metric values relative to an operator performance metric value corresponding to the first operator, the search system identifying a subset of the first set of operator performance data based on the identified range;
  a data retrieval component that retrieves the subset of operator performance data; and
  an output component that outputs the subset of operator performance data as a reference data set for comparison against operator performance data for the first operator.

Example 20 is the agricultural data retrieval system of any or all previous examples and further comprising:
  a data volume component that determines whether a volume of data in the subset of operator performance data meets a statistical significance threshold and if not, either changes the range of operator performance metric values or accesses a filter criteria hierarchy that hierarchically arranges the context filter criteria and changes the context filter criteria used in identifying the first set of operator performance data, the search system identifying a third set of operator performance data based on the changed range or context filter criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural data search engine, comprising:
  a processor generating an index of performance data, stored in a data store, the performance data being indicative of performance of a plurality of different agricultural machines having different operators, the index indexing the performance data based on machine and worksite context criteria and on performance metric values;
  a set of sensors detecting current machine and worksite context data corresponding to a selected agricultural machine;
  a performance metric generator generating a current performance metric value indicative of machine performance of the selected agricultural machine;
  a search system detecting a data retrieval trigger;
  a criteria identifier component selecting context filter criteria from a context filter criteria hierarchy based on the detected current machine and worksite context data;
  a context filter system filtering the performance data using the index and the selected context filter criteria to identify a first set of performance data;
  a score range identifier component identifying a score range, relative to the current performance metric value;
  a performance metric filter system filtering the first set of performance data using the index and the identified score range to modify the first set of performance data to identify a second set of performance data that is different from the first set of performance data;
  a data volume analysis component identifying a quantity of underlying data, in the data store, underlying the second set of performance data and from which the second set of performance data was generated and, if the quantity of underlying data is above a first quantity value, then reducing the score range and repeating filtering the first set of performance data to decrease the quantity of underlying data and, if the quantity of underlying data is below a second quantity value, then increasing the score range and repeating the step of filtering the first set of performance data to increase the quantity of underlying data;
  a data retrieval component generating a database control signal to retrieve the underlying data underlying the second set of performance data; and
  an output component returning the retrieved underlying training data based on the detected data retrieval trigger.

2. The agricultural data search engine of claim 1 wherein the context filtering system filter the performance data by using:
  the search system to search for the first set of operator performance data that matches the context filter criteria and wherein the performance metric filter system filters the first set of performance data by using the search system to search the first set of performance data for the second set of operator performance data based on the identified range and the first set of operator performance data.

3. The agricultural data search engine of claim 2 and further comprising:
  a data store that stores the context filter criteria hierarchy so it is configurable by an operator.

4. The agricultural data search engine of claim 3 and further comprising:
a first data volume analysis component that determines whether a volume of underlying data underlying the first set of performance data meets a statistical significance threshold.

5. The agricultural data search engine of claim 4 wherein the criteria identifier component is configured to access the context filter criteria hierarchy and change the selected context filter criteria used in identifying the first set of performance data, based on the first data volume analysis component determining that the volume of underlying data does not meet the statistical significance threshold, to increase an amount of underlying data when the context filter system filters the performance data.

6. The agricultural data search engine of claim 1 wherein the data retrieval component retrieves the operator performance data in units comparable to units of the operator performance data upon which the current performance metric value is generated.

7. The agricultural data search engine of claim 1 wherein the set of sensors comprise at least one of a geographic location sensor, a machine type sensor, a machine configuration source or a crop sensor.

8. The agricultural data search engine of claim 1 wherein the performance metric filter system is configured to identify the second set of operator performance data as a subset of the first set of performance data.

9. A computer implemented method, comprising:
generating, using a processor, an index of performance data, stored in a data store, the performance data being indicative of performance of an agricultural machine having an operator, the index indexing the performance data based on machine and worksite context criteria;
detecting, using a set of sensors, current machine and worksite context data corresponding to a selected agricultural machine;
generating a current performance metric value indicative of machine performance of the selected agricultural machine;
selecting context filter criteria from a context filter criteria hierarchy based on the detected current machine and worksite context data;
filtering, using a search system, the performance data using the index and the selected context filtering criteria to identify a first set of performance data;
identifying a score range, relative to the current performance metric;
filtering, using the search system, the first set of performance data using the index and the identified score range to modify the first set of performance data to identify a second set of performance data that is different from the first set of performance data;
identifying a quantity of underlying data, in the data store, underlying the second set of performance data and from which the second set of performance data was generated;
if the quantity of underlying data is above a first quantity value, then reducing the score range and repeating filtering the first set of performance data to decrease the quantity of underlying data;
if the quantity of underlying data is below a second quantity value, then increasing the score range and repeating the step of filtering the first set of performance data to increase the quantity of underlying data; and
generating a database control signal to retrieve the underlying data underlying the second set of performance data.

10. The computer implemented method of claim 9 and further comprising:
receiving a hierarchy change operator input; and
configured the context filter criteria hierarchy based on the hierarchy change operator input.

11. The computer implemented method of claim 10 and further comprising:
determining whether a volume of underlying data corresponding to the first set of performance data meets a statistical significance threshold;
if not, accessing the filter criteria hierarchy and changing the context filter criteria used in identifying the first set of performance data; and
modifying the first set of performance data based on the changed context filter criteria.

12. The computer implemented method of claim 9 wherein detecting current machine and worksite context information comprises: sensing the machine context information as at least one of a geographic location, a machine type, a machine configuration or a crop characteristic.

* * * * *